(12) United States Patent
Pretorius et al.

(10) Patent No.: US 10,707,803 B2
(45) Date of Patent: Jul. 7, 2020

(54) PHOTOVOLTAIC MODULE MOUNTING SYSTEM AND METHOD

(71) Applicant: Tessolar Inc., Cambridge, MA (US)

(72) Inventors: Jacob Van Reenen Pretorius, Somerville, MA (US); Leslie G. Fritzemeier, Lexington, MA (US); Malcolm Cummings, Somerville, MA (US); Yang Jin, Somerville, MA (US); Katherine Hartman, Cambridge, MA (US); Alastair Taylor, Somerville, MA (US); Michael Ross Everman, Santa Barbara, CA (US)

(73) Assignee: Tessolar Inc., Woburn, MA (US)

(*) Notice: Subject to any disclaimer, the term of this patent is extended or adjusted under 35 U.S.C. 154(b) by 0 days.

(21) Appl. No.: 16/024,155

(22) Filed: Jun. 29, 2018

(65) Prior Publication Data

US 2019/0006982 A1    Jan. 3, 2019

Related U.S. Application Data

(60) Provisional application No. 62/526,932, filed on Jun. 29, 2017.

(51) Int. Cl.
| | |
|---|---|
| *H02S 20/23* | (2014.01) |
| *H02S 30/10* | (2014.01) |
| *F16B 9/02* | (2006.01) |
| *F16M 11/24* | (2006.01) |
| *H02S 99/00* | (2014.01) |
| *F16B 5/06* | (2006.01) |

(52) U.S. Cl.
CPC ............ *H02S 20/23* (2014.12); *F16B 5/0628* (2013.01); *F16B 9/02* (2013.01); *F16M 11/24* (2013.01); *H02S 30/10* (2014.12); *H02S 99/00* (2013.01)

(58) Field of Classification Search
CPC .......... H02S 20/23; H02S 99/00; H02S 30/10; F16M 11/24; F16B 9/02; F16B 5/0628
USPC ........................................................ 52/173.3
See application file for complete search history.

(56) References Cited

U.S. PATENT DOCUMENTS

| | | | |
|---|---|---|---|
| 8,505,864 B1* | 8/2013 | Taylor .................. | F24S 25/636 248/237 |
| 8,935,893 B2* | 1/2015 | Liu .......................... | F16L 3/06 52/173.3 |
| 9,473,066 B2* | 10/2016 | Stephan ................. | H02S 20/23 |
| 9,496,820 B2 | 11/2016 | Seery et al. | |
| 10,090,800 B2* | 10/2018 | McPheeters ........... | H02S 20/30 |
| 10,205,419 B2* | 2/2019 | McPheeters ........... | H02S 20/30 |
| 10,320,325 B1* | 6/2019 | Atia ........................ | H02S 20/23 |
| 10,340,837 B2* | 7/2019 | Wildes | |

(Continued)

FOREIGN PATENT DOCUMENTS

KR    1020160018228 A    2/2016

*Primary Examiner* — Jeanette E Chapman
(74) *Attorney, Agent, or Firm* — Loginov & Associates, PLLC; William A. Loginov

(57) ABSTRACT

A photovoltaic (PV) module mounting system can have mounting clips that can be moved up and down a roof, and can allow the height of the mounting clips to be adjusted relative to the roof. At least a portion of the system can be made of a non-conductive material so that the system can be free of a grounding unit. The system can allow solar modules to be quickly installed, and can allow the solar modules to be removed quickly for repair or in the event of a fire.

18 Claims, 17 Drawing Sheets

(56) References Cited

U.S. PATENT DOCUMENTS

| | | | |
|---|---|---|---|
| 2010/0236542 A1* | 9/2010 | Pierson | H02S 20/23 126/621 |
| 2011/0220596 A1* | 9/2011 | Cusson | H02S 20/30 211/41.1 |
| 2012/0007365 A1* | 1/2012 | Harrison | E03B 3/03 290/55 |
| 2012/0102853 A1* | 5/2012 | Rizzo | H02S 20/23 52/173.3 |
| 2013/0327373 A1* | 12/2013 | Gentry | H02S 30/10 136/251 |
| 2014/0230877 A1 | 8/2014 | Goldberg et al. | |
| 2015/0280638 A1* | 10/2015 | Stephan | H02S 20/23 52/173.3 |
| 2016/0126884 A1* | 5/2016 | Stearns | H02S 20/23 52/173.3 |
| 2016/0142006 A1 | 5/2016 | Meine et al. | |
| 2016/0226435 A1 | 8/2016 | Almy | |
| 2016/0254774 A1 | 9/2016 | Brady | |
| 2016/0308487 A1 | 10/2016 | Molina | |
| 2018/0131313 A1* | 5/2018 | Powell | G08G 1/0955 |
| 2019/0013772 A1* | 1/2019 | Bamat | H02S 20/23 |
| 2019/0252902 A1* | 8/2019 | Koch | A47B 9/04 |

* cited by examiner

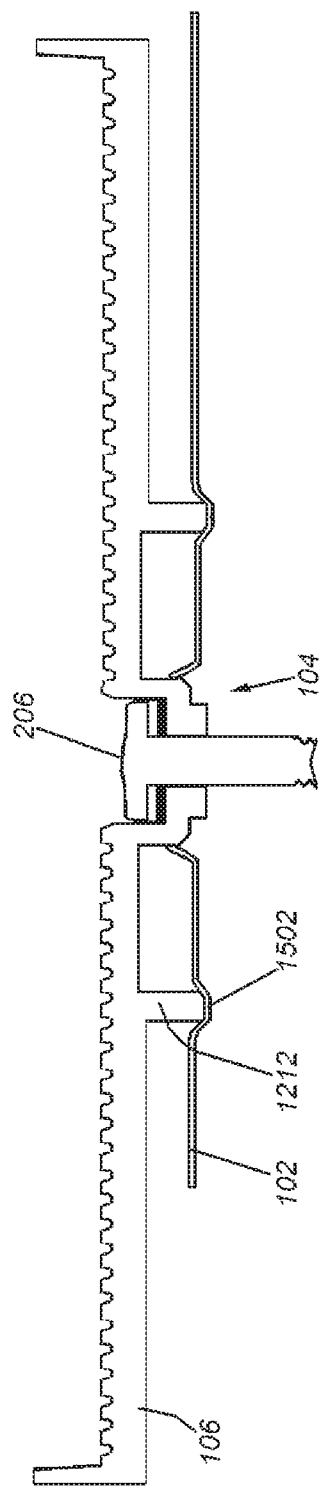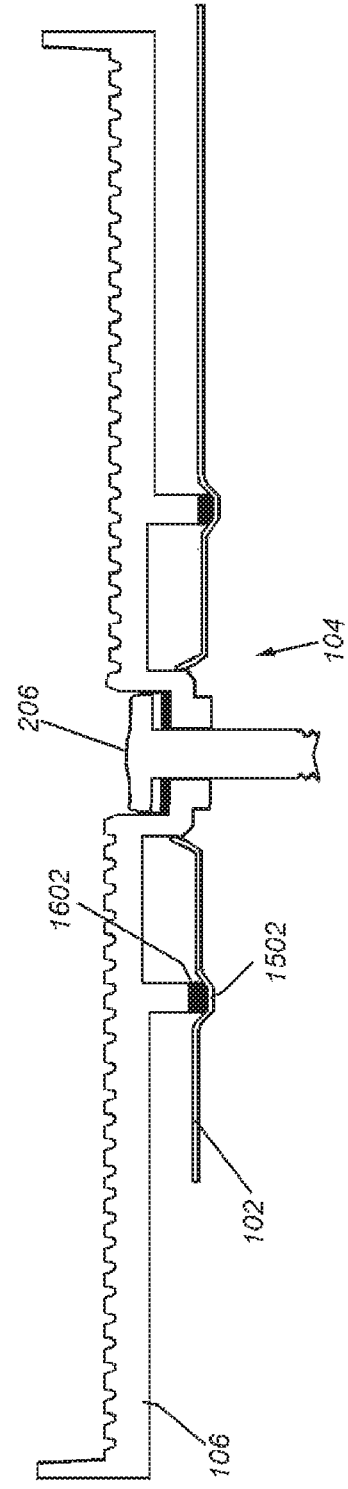

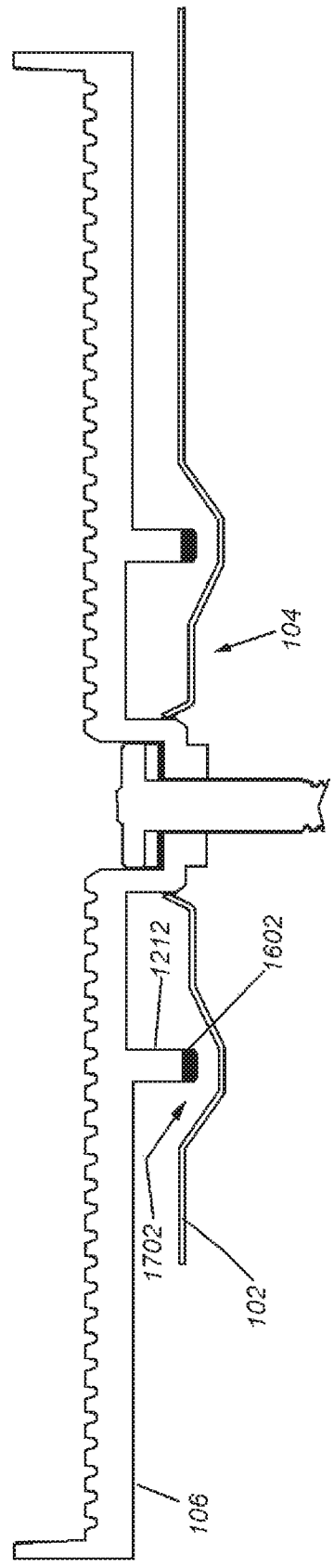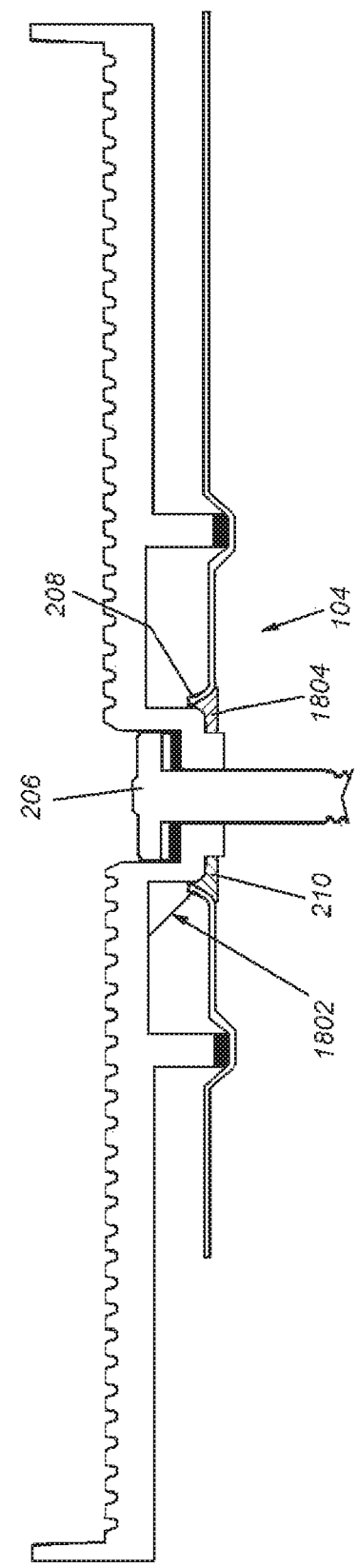

PHOTOVOLTAIC MODULE MOUNTING SYSTEM AND METHOD

FIELD OF THE INVENTION

This invention relates to solar photovoltaic (PV) modules and systems and the attachment of such systems to building rooftops.

BACKGROUND OF THE INVENTION

As mankind continues to develop around the world, the demand for energy rises. Most energy used to power machines and generate electricity is derived from fossil fuels, such as coal, natural gas or oil. These supplies are limited and their combustion causes atmospheric pollution and the production of carbon dioxide, which is suspected to accelerate the greenhouse effect and lead to global climate change. Some alternative approaches to produce energy include the harnessing of nuclear energy, wind, moving water (hydropower), geothermal energy or solar energy. Each of these alternative approaches has drawbacks. Nuclear power requires large capital investments and safety and waste disposal are concerns. Wind power is effective, but wind turbines require a windy site, often far away from grid connections and take up large footprints of land. This energy production system also requires continual mechanical maintenance, and can have an impact on the aesthetics of the surroundings and wildlife. Hydropower requires the construction of large, potentially environmentally harmful dams and the displacement of large volumes of flowing water. The number of such flowing water bodies is highly limited, both regionally and in an absolute sense. Geothermal power requires a source of energy that is relatively near the surface—a characteristic not common to a large portion of the Earth—and has the potential to disrupt the balance of forces that exist inside the Earth's crust. However, solar is one of the cleanest and most available forms of renewable energy and it can be harnessed by direct conversion into electricity (solar photovoltaic) or by heating a working fluid (solar thermal).

Solar photovoltaic (PV) technology relies on the direct conversion of solar power into electricity through the photoelectric effect in a solar cell: solar radiation impinging on semiconductor junctions can excite pairs of conduction electrons and valence holes. These charged particles travel through the junction and can be collected at electrically conductive electrodes to form an electric current in an external circuit. A PV module can include at least one solar cell that can be a part of a solar laminate, and can include a supporting frame. A solar laminate can have at least one solar cell between two layers of encapsulant. A PV module can also have a supportive backing under the solar laminate and connected to the frame to provide additional support for the solar laminate.

Photovoltaic is one of the most promising technologies for producing electricity from renewable resources, for a number of reasons: (1) The photovoltaic effect in Si and other solid-state semiconductors is well understood and the technology fully validated; (2) PV power modules convert solar power directly into electrical power, have no moving parts and require low maintenance, and can be located on almost any surface due to relatively light weight and thin profile; (3) Solar radiation is quite predictable and is at a maximum during hours of peak electricity consumptions; and (4) The industry has been aggressively pursuing a performance improvement and cost reduction path, approaching market competitiveness with traditional energy resources in many parts of the world.

There are two measures of value to the customer that is utilized in the industry. The first is the installation cost of the system. The metric that is most widely used for comparison is the total system cost divided by the name plate power of the system in Watts. The unit for this metric is $/W. The second measure is the cost of energy delivered over the lifetime of the system. This is referred to as the Levelized Cost of Energy or LCOE. LCOE in dollars per kilowatt-hour ($/kWh) is calculated by dividing the system cost and maintenance costs by the energy produced by the system during its expected life. Customers decide whether or not to convert to solar energy based on LCOE and decide which vendor to use based in $/W. It is thus desirable to reduce both metrics.

As the price of photovoltaic (PV) modules continues to fall, the cost of ownership (both in terms of $/W and $/kWhr) of a PV system is increasingly being dictated by the so-called balance of system costs. For a rooftop installed PV system, these include the following specific items:

1. Power management hardware: These include parts such as inverters, optimizers and rapid shutdown electronics.
2. System installation hardware: All the racking, mounting, roof attachment, skirting, nuts and bolts, and other pieces of hardware that are required to secure the PV modules to a roof.
3. Labor costs: These include the labor to install the system installation hardware, attach the PV modules to the hardware, the electrical wiring of the PV modules to each other and to the power management hardware, the integration of proper grounding to all exposed metal and the upgrading of the roof if required.
4. Permitting: The act of receiving a permit from the town to operate the PV system. This requires adherence to local and national codes, including fire and electrical codes. Furthermore these systems might need sign-off from professional engineers, fire marshals and other professionals.
5. Supply chain logistics: The cost of keeping inventory of multiple parts, issuing, storing and carrying all these parts onto the roof. Ensuring that parts and personnel expertise match at the site etc.
6. Indirect Costs: Operating equipment such as vehicles, ladders, lifts and tools. Administrative costs such as payroll, insurance, warranty servicing, and management.
7. Cost of sales: This includes marketing and sales; the time and effort required to identify and obtain the customer. The cost of sale is often independent of the size of the system.

The first two items (1 and 2) on the list above are direct material costs to the system, while items 3 and 4 are direct costs, and items 5, 6 and 7 are considered overhead. This means that items 1 through 4 typically scale with the size of the system where items 5 and 6 are independent of the size of the system.

From the above it will be clear that it is desirable to minimize both the direct labor and material cost of any system in order to reduce the overall cost of the system and therefore increase the probability of selling and installing a system. In addition, minimizing the costs of each installed system will directly reduce the overhead costs attributable to each system. Furthermore, increasing the size of the installed system will proportionally reduce the indirect cost of the system.

Rooftop PV systems can be installed using a variety of existing mounting hardware. Existing mounting solutions can generally be categorized as "railed" or "rail-less". As the descriptive name indicates, the former includes long beams, or "rails", typically made of aluminum metal, that provide support to the array of modules. The rails are especially required in regions where the solar modules can be exposed to heavy snow loading because the module construction is not adequate to support the additional weight of the snow. The rail-less systems offered commercially by companies such as Pegasus Solar and Zepp have gained market traction because of the ease with which they can be installed. This reduces the installation time and therefore direct labor of the system. However, these systems cannot be used in regions of heavy snow or wind loading because they do not provide the additional structural support necessary to meet local codes and requirements. Both the railed and rail-less systems are attached to the roof using a large number (typically 30-50) of individual metal parts, including bolts, nuts washers, multi-part clamps and brackets, as described in U.S. Pat. No. 9,800,199, titled ROOF ATTACHMENT ASSEMBLY FOR SOLAR PANELS AND INSTALLATION METHOD, U.S. Pat. No. 9,496,820, titled PHOTOVOLTAIC MOUNTING SYSTEM AND DEVICES, U.S. Pat. No. 9,473,066, titled MOUNTING ASSEMBLIES FOR SOLAR PANEL SYSTEMS AND METHODS FOR USING THE SAME, and U.S. patent application Ser. No. 14/054,807, the entire disclosures of which are incorporated herein as background information.

Although rail-less systems can be installed more quickly, current art unfortunately only teaches rail-less systems that cannot withstand all required snow and wind loads experienced around the world. Current options to increase load capabilities is to either increase the thickness of the module glass, or increase the stiffness of the mounting frame or utilize a framed system that mounts the PV module in such a way that high snow load conditions do not cause failure in the PV module components. These solutions come with the burden of added weight, size and installation time as will be known to those skilled in the art.

The use of metallic parts, in combination with the aluminum exterior frame that is part of a standard PV module construction leads to the requirement to electrically ground the rooftop PV system. Grounding often requires heavy copper cable that must be connected to a copper rod driven into the ground at the foundation of the building. Grounding is usually required to be done by a licensed electrician, further increasing both hardware and labor costs.

Overhead and indirect cost are not dependent on system size and contribute a significant portion of the total cost of the system. Cost-of-sales, or the cost of identifying and acquiring the customer, can be the single largest overhead item in a smaller, residential installation. Therefore it will be desirable not only to reduce the indirect costs by making the system easier to sell for instance, but it is also desirable to sell and install the largest possible system per costumer. Additionally it is desirable to make the installation process as efficient as possible. For example, doubling the speed of installation would allow the same installation crew to generate about twice as much revenue, reducing the fixed overhead cost allocated to each system by 50%, providing significant operating leverage for the installer.

A PV module can include a solar laminate that includes at least one solar cell, a supporting backing under the solar laminate, and a supporting frame around the perimeter of the PV module. The majority of solar PV modules utilize an electrically conductive aluminum frame that surrounds the entire module. This frame serves as a structural enforcement that assists the glass front face of the module to protect the fragile solar cells from the environment, including structural loads from wind and snow accumulation. The frame also serves as the interface between the module and the mounting system that secures it to a roof or the ground in an existing PV installation system.

Mounting systems that are structurally attached to the roof are typically made from conductive metal. The mounting systems typically consist of a multitude of parts that allow the installer of the system to connect the system to the rafters of the house or to a metal roof covering, provide structural stability, secure the module to the roof and provide the ability to adjust the installation so that it aesthetically aligns with features of the roof.

As can be appreciated by those skilled in the art, there are a number of deficiencies with current PV module mounting systems. These can be summarized as follows:

1. Exposed metal on the modules require the modules as well as the mounting system to be grounded. This requirement has the drawback that a means of electrical conductivity must be established between the module frame and the earth ground. This increases the amount of material and labor required for a PV installation and thus the cost. Furthermore, the new NEC 2017 electrical code requires that all grounded PV systems have a means of rapid shutdown that disconnects the modules from each other electrically. These rapid shutdown systems are costly and take time to install, further driving up direct costs to the PV system. In addition, the voltages in modules are increasing to reduce power loss in the conducting wires. Having cells at high voltage while the frame is at ground is the driving force for Potential Induced Degradation (PID), a major contributor to the gradual loss in power generation capacity of a PV module 2. Mounting systems require a significant amount of assembly on the roof.

3. Mounting systems require precision layout, measuring and attachment to the roof.

4. Rail—less systems reduce the amount of assembly steps and thus decrease the time of installations. However, when utilized in conjunction with standard modules, they cannot withstand high snow and wind load conditions.

5. The large number of parts of mounting systems require significant resources to maintain inventory, schedule deliveries and issue parts to crews going to the job-site. This logistic burden increases the indirect costs of systems.

6. Inability to release the module from the roof without proper tools increases the time to repair units and can obstruct firefighters from performing their duties.

SUMMARY OF THE INVENTION

The present invention overcomes these deficiencies of the prior art by reducing the part count on the roof, eliminating the need for grounding the modules, providing flexibility in position adjustment after securing the modules on the roof, and allowing for rapid release of the module for maintenance or firefighting operations. Additionally, utilizing functional, non-metallic composite materials that are electrically insulating for the structural security and mounting of photovoltaic (PV) modules has a number of advantages that have not been appreciated and applied in prior art.

The present invention also addresses a multiplicity of the above-described disadvantages that drive installer cost in order to enable lower system cost and broader penetration of rooftop solar into the energy market, fundamentally benefitting both the solar power industry and the global environment. The invention described in this application aims to overcome the deficiencies of the prior art by reducing or eliminating rooftop assembly of a large number of mounting hardware parts, and can minimize layout and installation precision by providing substantial adjustability in and out of the plane of the roof and adjustability up and down the slope of the roof, and can utilize hardware clips onto the module at any point for cross-slope adjustability. The system can allow the ability to adjust height after modules are installed on the mounting hardware. The system can also eliminate the need to ground the PV array by utilizing composite materials for the PV module frame and the mounting hardware, and can reduce the time and material cost associated with grounding modules and eliminate the need for rapid-shutdown devices as required by NEC 2017. The system can also enable a rail-less design that can be certified for high snow load conditions, and can provide a quick release mount that allows fast module replacement and easy dismount for emergency (fire) access. This will allow the array to fill the entire roof, increasing the size of the system. The present disclosure can provide a system of rail-less PV module mounting that can increase resistance to snow loads by providing a displacement restrictor that can allow a rail-less system to withstand high snow loads.

In an embodiment, a solar module installation system can include a mounting base and a mounting post, wherein the mounting post is adjustably engaged with the mounting base so that the height of the mounting post with the mounting base is variable, and at least one mounting clip attached to the mounting post. The system can include an adjustable foot that defines a channel configured to receive the mounting base. The mounting base can include at least one base engagement feature, and the adjustable foot can include at least one foot engagement feature, so that the base engagement feature and the foot engagement feature can secure the mounting base to the adjustable foot. The at least one foot engagement feature can be at least one foot snap-in groove, and the at least one base engagement feature can be at least one snap-in groove. The adjustable foot can include at least one clip-in groove configured to slideably engage the mounting base, wherein the clip-in groove slidably holds the mounting base out of engagement with the at least one foot snap-in groove, and wherein an application of force to the mounting base can push the mounting base out of engagement with the clip-in groove an into engagement with the at least one foot snap-in groove. The system can also have a flashing with a flashing engagement feature, wherein the flashing engagement feature is configured to engage the flashing with the adjustable foot. The flashing engagement feature can be a clearing hole, and the adjustable foot can have a bolt hole, so that a bolt can be passed through the adjustable foot and the flashing. The system can include at least one pin, wherein the at least one mounting clip can be pivotably mounted to the mounting post at the at least one pin. The system can include a mounting clip with a screw head cavity, wherein the screw head cavity can be configured to hold a screw head within the screw head cavity, and wherein the mounting base can include a threaded screw engagement feature. The system can include an adjustment screw with a screw head, so that the screw head can be held within the screw head cavity, and wherein the adjustment screw can be threaded through the screw engagement feature of the mounting base, so that that turning the adjustment screw in a first direction will cause the mounting clip to slide relative to the mounting base to increase the combined height of the mounting clip and the mounting base, and wherein turning the adjustment screw in a second direction will cause the mounting clip to slide relative to the mounting base to decrease the combined height of the mounting clip and the mounting base. The at least one mounting clip can include at least one solar module frame engagement feature that is constructed and arranged to be attached to a solar module. The system can include at least one non-conductive frame that includes a lower frame engagement feature and an upper frame engagement feature. The lower engagement feature can be configured to engage with the at least one mounting clip, and the upper engagement feature can be configured to be attached to a solar laminate. The mounting clip can include a flexible member configured to flex under force. The mounting clip can be configured to have a solar module attached to the at least one mounting clip. At least one of the mounting base, the mounting post, the mounting clip, and a PV module frame are comprised of a non-electrically conductive material, so that the system is free of a grounding unit. The at least one mounting clip can include a fast-release mechanism configured to release the solar module when a vector force is applied to the fast release mechanism. The mounting clip can include an adhesive configured to secure a solar module to the mounting clip. The adhesive can be a reclosable fastener system.

A method for installing a solar module can include engaging a mounting base into a snap-in groove of an adjustable foot, sliding the mounting base within the snap-in groove of the adjustable foot to position the mounting base in a desired location along the adjustable foot, pressing the mounting base into the adjustable foot, so that the mounting base disengages from the snap-in groove and so that a mounting base engagement feature is pressed into engagement with a foot engagement feature, thereby securing the mounting base to the adjustable foot, turning an adjustment screw that connects a mounting post to the mounting base, so that the height of the mounting post is adjustable relative to the adjustable foot, and attaching a solar module to a mounting clip attached to the mounting post. The method can include installing a flashing with a clearing hole at least partially under a shingle on a roof, aligning a bolt hold in the adjustable foot with the clearing hole, and installing a bolt through the bolt hold in the adjustable foot, through the clearing hole, and into the roof. Attaching the solar module to the mounting clip can include attaching a solar laminate to a frame, and attaching the frame to the mounting clip. The method can include releasing the solar module from attachment to the mounting clip by applying a vector force to a fast-release mechanism on the mounting clip or adjustable foot.

BRIEF DESCRIPTION OF THE DRAWINGS

The invention description below refers to the accompanying drawings, of which:

FIG. 15 is a cross sectional view of a flashing with a trench, a foot, and a waterproof union, taken along cross section line 13-13 of FIG. 5A, according to an illustrative embodiment;

FIG. 16 is a cross sectional view of a flashing, a foot, and a waterproof union with an elastomeric seal, taken along cross section line 13-13 of FIG. 5A, according to an illustrative embodiment;

FIG. 17 is a cross sectional view of a flashing with an open feature to allow trapped water to escape, a foot, and a waterproof union with an elastomeric seal, taken along cross section line 13-13 of FIG. 5A, according to an illustrative embodiment;

FIG. 18 is a cross sectional view of a flashing, a foot, and a waterproof union with additional elastomeric seals, taken along cross section line 13-13 of FIG. 5A, according to an illustrative embodiment;

DETAILED DESCRIPTION

The present disclosure is an illustrative example of a roof mounting system for PV modules that achieves the stated benefits. This should be viewed as an illustrative embodiment of the invention, intended to explain the features and as will be appreciated by those skilled in the art by no means the only way to achieve the stated utility of the invention.

Figure 1:
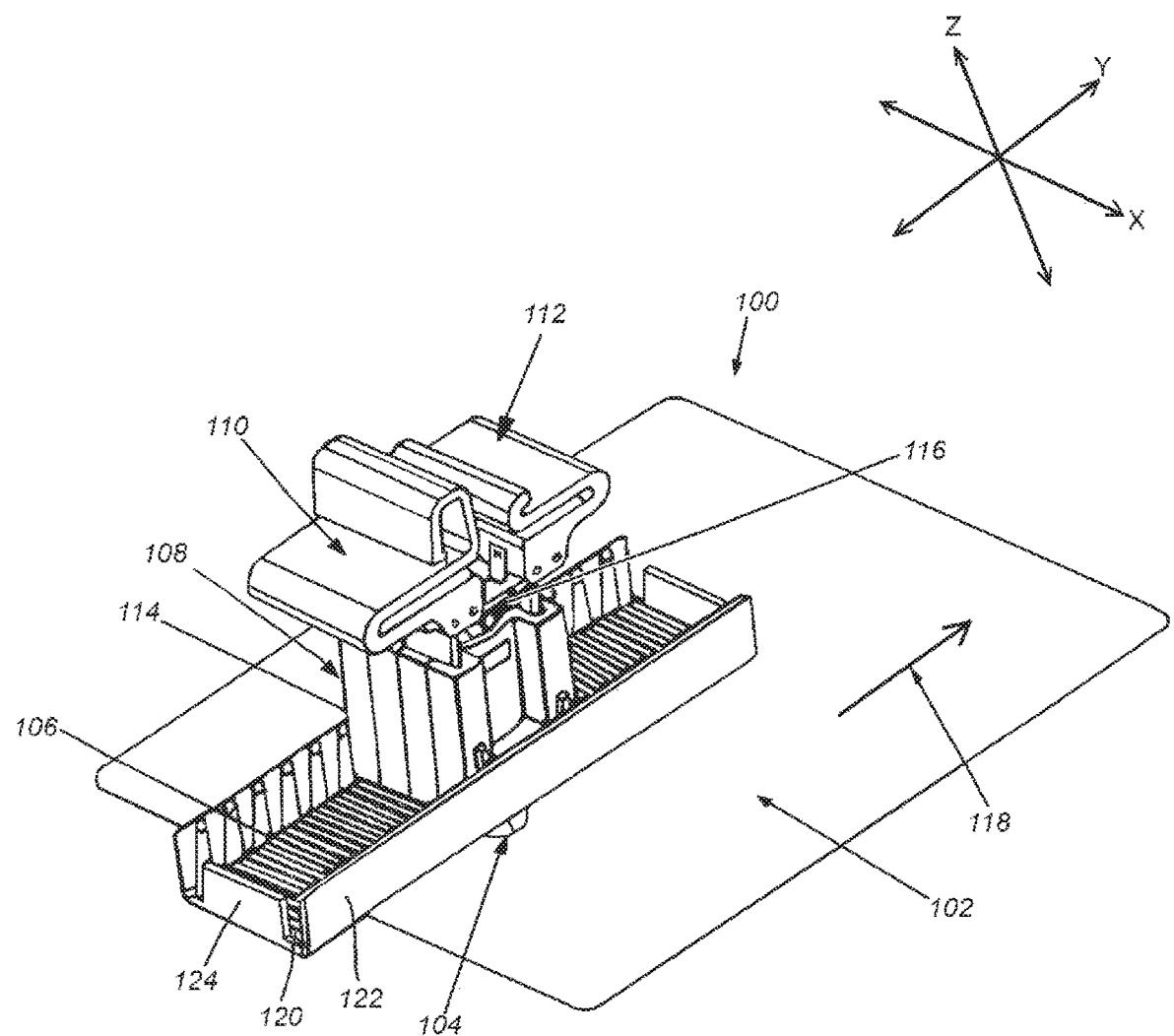
FIG. 1 is a perspective view of a system for mounting PV modules to a rooftop, according to an illustrative embodiment.

FIG. 1 is a perspective view of a system for mounting PV modules to a rooftop, according to an illustrative embodiment. In the embodiment, a PV mounting system 100 can include a flashing 102, waterproof union 104, adjustable foot 106, mounting stand 108, a top clip 110, and a bottom clip 112. The system can be installed with direction arrow 118 pointing to the top of the roof. Bottom clip 112 can hold the bottom of an upper PV module that is mounted closer to the top of the roof, and top clip 110 can hold the top of a lower PV module that is mounted farther from the top of the roof. Mounting stand 108 can have a mounting base 114 and a mounting post 116. Foot 106 can have a floor 120, sidewalls 122, and a stopper 124.

This type of a system can allow for mounting clips 110 and 112 to be adjusted into place to accommodate the solar cells that can be part of an assembled PV module after the system is secured to the roof. The system allows for the location of the PV modules to be adjusted in three axes. The system can be adjusted along the y-axis (up and down slope of the roof), shown as parallel to direction 118, by sliding mounting base 114 inside the up-down adjustable foot 106 until the mounting base 114 is in a desired location that can align properly with a PV module frame. The PV module frame can further slide within the top clip 110 and/or bottom clip 112 in a back-and-forth direction along the x-axis, or put another way, across the slope of the roof in a direction perpendicular to arrow 118, allowing for adjustment of the entire array of one or more PV modules from side to side. When the system is fine tuned in the plane of the roof, modules can be secured to top clip 110 by forcing the module's frame into top clip 110 and snapping the fitting into place, explained more fully below. This snap fit method of mechanical securing is well known to those skilled in the art. The clips shown in FIG. 1 are exemplary, and various clip embodiments can be used, as explained more fully below. Mounting base 114 can be secured to north-south adjustable foot 106 by snapping the mounting base 114 into place in the adjustable foot 106. Mounting post 116 can be adjustable by means of a leveling screwing mechanism to allow for vertical adjustment of the PV module along the z-axis in the direction perpendicular to the plane of the roof.

Figure 2:
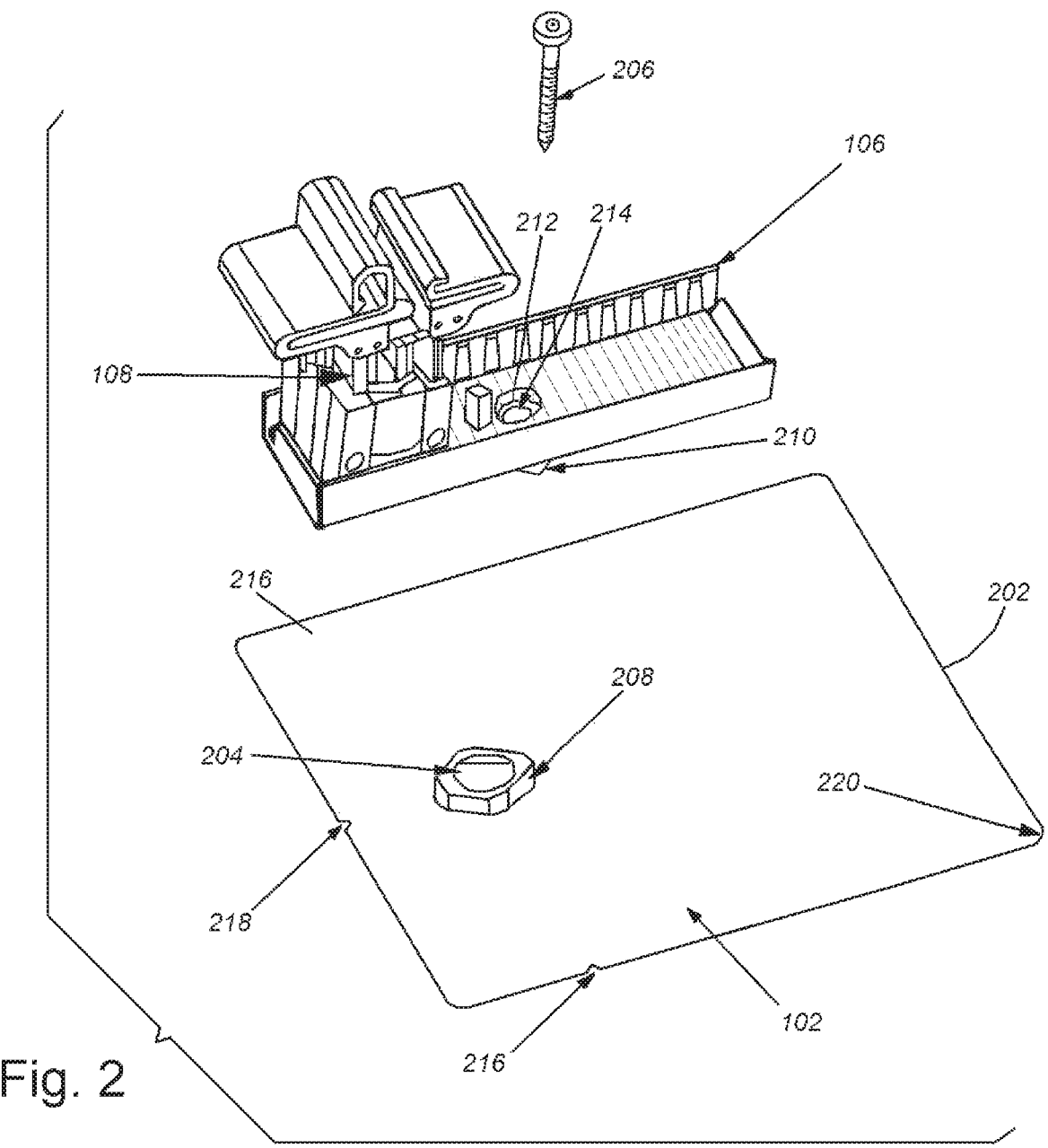
FIG. 2 is an exploded perspective view of the mounting system of FIG. 1, according to an illustrative embodiment.

FIG. 2 is an exploded perspective view of the mounting system of FIG. 1, according to an illustrative embodiment. An exemplary method for securing flashing 102 and north-south foot 106 to a roof is explained below. Flashing 102 can be a sheet of material that can be, for example, a metal or rigid plastic material. Flashing 102 can have an insertion edge 202 that can be slid under sloped roof coverings such as, for example, ubiquitous composite shingles, so that at least a portion of the flashing 102 can be under the roof covering, and water can flow over the roof covering in the case of rain. Flashing 102 can be made from any durable, waterproof material that is approved for use on a roof by UL and other approval agencies. These materials include but are not limited to aluminum, steel, copper, some plastics and composite materials. Flashing 102 can be formed such that a there is a sufficient clearing hole 204 for a fastener, such as a lagging bolt 206, to be placed though the flashing 102 in order to secure the system to the roof. A raised neck rim 208 on flashing 102 can also be raised with respect to the rest of flashing 102 to ensure that any water running down the roof cannot flow into clearing hole 204. Adjustable foot 106 can have a mating profile 210 that can mate with neck rim 208 so that mating profile 210 and neck rim 208 can fit together snugly. In various embodiments, the mating profile 210 can be inserted into and engaged within the neck rim 208. An outer surface of the mating profile 210 can seal against an inner surface of the neck rim 208 to prevent water from entering the clearing hole 204, explained more fully below. Adjustable foot 206 can have a fastener hole 212 with a seat 214 for a lagging bolt 206 or other fastener. Fastener hole 212 can allow lagging bolt 206 to pass through the foot 106, into the roof via clearing hole 204 in flashing 102. As lagging bolt 206 is screwed into the roof, it can engage the mating surfaces of seat 214, force adjustable foot 106 onto flashing 102, and forcing mating profile 210 to mate with neck rim 208. When mating profile 210 is engaged with neck rim 208, they can form the waterproof union 104. Lagging bolt 206 or seat 214 can incorporate a waterproofing compressible seal, such as a gasket or o-ring, so that engagement of the bolt 206 with the seat 214 can provide a watertight seal, and prevent water from entering the fastener hole 212. These types of seals are ubiquitous and available commercially off-the-shelf from a number of suppliers. As will be appreciated by those skilled in the art, forcing mating profile 210 into engagement with neck rim 208 can further secure the interface between the neck rim 208 of the flashing 102 and adjustable foot 106 to prevent any water from flowing from the surface of flashing 102 into clearing hole 204 and thus into the roof.

Flashing 102 can also be optionally equipped with horizontal alignment notches 216 that can be used to align flashing 102 with mounting markings on the roof. Similarly, vertical alignment notch 218 can allow for alignment with fiduciary marks that can be made along the rafter on the roof to assure that lagging bolt 206 is secured into the rafter of the roof. Optionally insertion edges 202, and particularly a leading corner 220, can be beveled so that the act of sliding flashing 102 under roof shingles does not damage said shingles.

Figure 3:
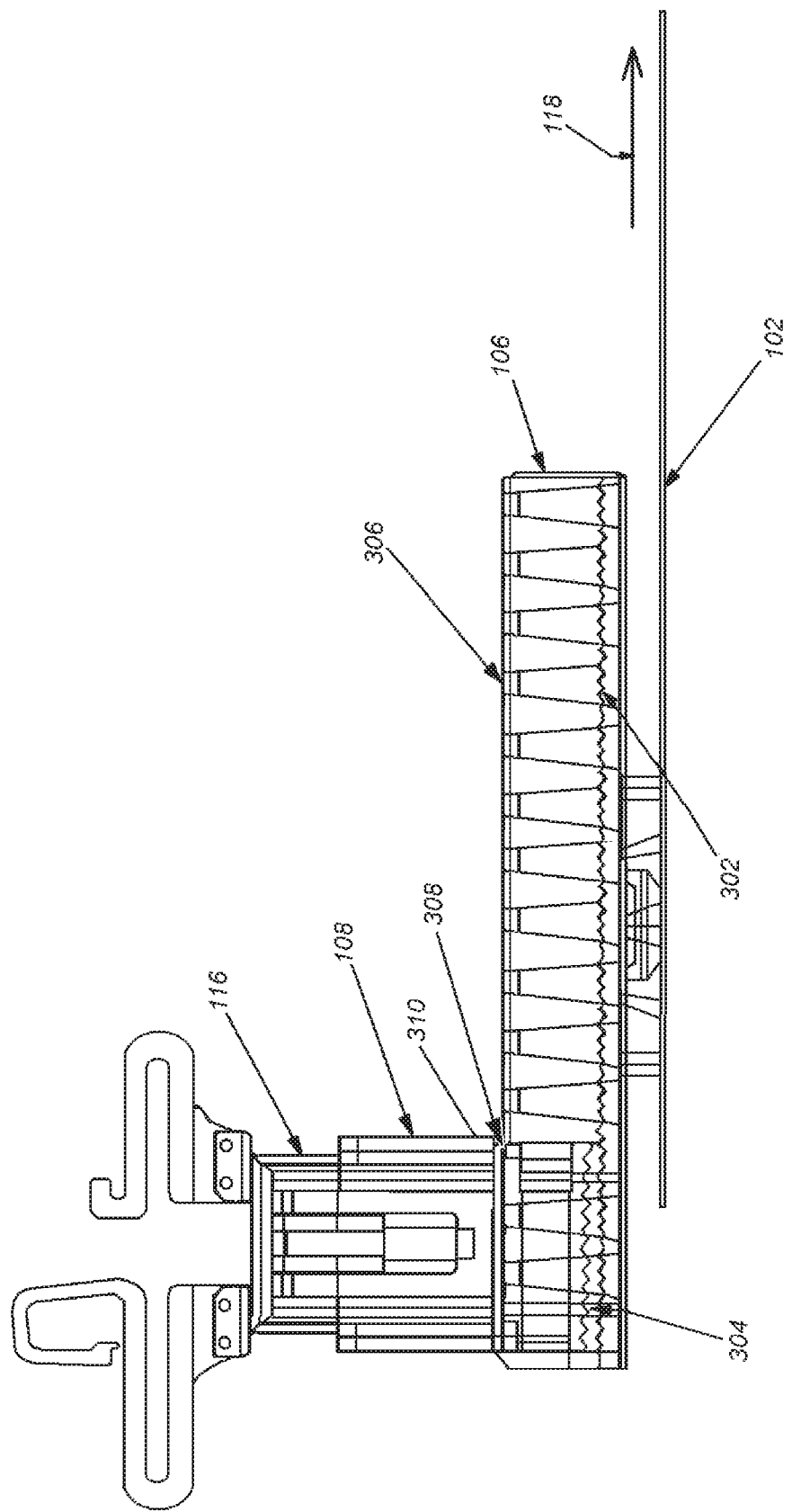
FIG. 3 is an exposed side view of the mounting system of FIG. 1, showing the inner workings of a north-south foot and its interaction with a mounting base, according to an illustrative embodiment.

FIG. 3 is an exposed side view of the mounting system of FIG. 1, showing the inner workings of an adjustable foot and its interaction with a mounting base, according to an illustrative embodiment. Adjustable foot 106 can be equipped with foot snap-in grooves 302 that can engage with corresponding base snap-in grooves 304 on the mounting stand 108. These grooves 302 and 304, once engaged with each other, can prevent base 114 from sliding up the roof in the direction of arrow 118, or down the roof in a direction opposite to arrow 118. The mounting base 114 can be engaged in a first engagement position with the foot 106, and in the first engagement position the mounting base 114 can slide along the length of the foot 106. The mounting base 114 can be further engaged into a second engagement position with the foot 106, so that the foot snap-in grooves 302 and the base snap-in grooves 304 are enmeshed together, so that the mounting base 114 can be held in a fixed location relative to the foot 106. In various embodiments, the mounting base 114 can be quickly disengaged from the foot 106 and easily repositioned, if necessary, explained more fully below.

In an embodiment, the foot 106 can have a snap-fitting 306 that can extend at least partially along the length of the foot 106, and the mounting stand 108 can have a first clip-in channel 308 and a second clip-in channel 310 on the mounting base 114. In various embodiments, snap-fitting 306 can be one or more inward ridges that can extend inwards from the sidewalls 122, or other protrusions extending inward. As shown in FIG. 3, snap-fitting 306 can be a series of inward protrusions extending inward from a portion of the sidewall 122 near the top of the sidewall 122. The first clip-in channel 308 on the mounting base 114 allows for the mounting base 114 to be engaged with snap-fitting 306 on north-south foot 106, with the snap-in base grooves 304 held above the snap-in foot grooves 302, without the snap-in base grooves 304 being engaged with the foot grooves 302, thus allowing the mounting base 114 to slide freely within north-south foot 106. Once the installer determines the correct position of mounting base 114 with respect to north south foot 106, the snap fitting 306 can be disengaged from the first clip-in channel 308 and the mounting base can be pushed down to engage a second snap-in channel 310 with the snap fitting 306, so that snap-in base grooves 302 and foot grooves 304 are intermeshed together, thereby securing the base 114 to the foot 106 together, and thus negating any free movement of mounting base 114 with respect to north-south foot 106.

Figure 4:
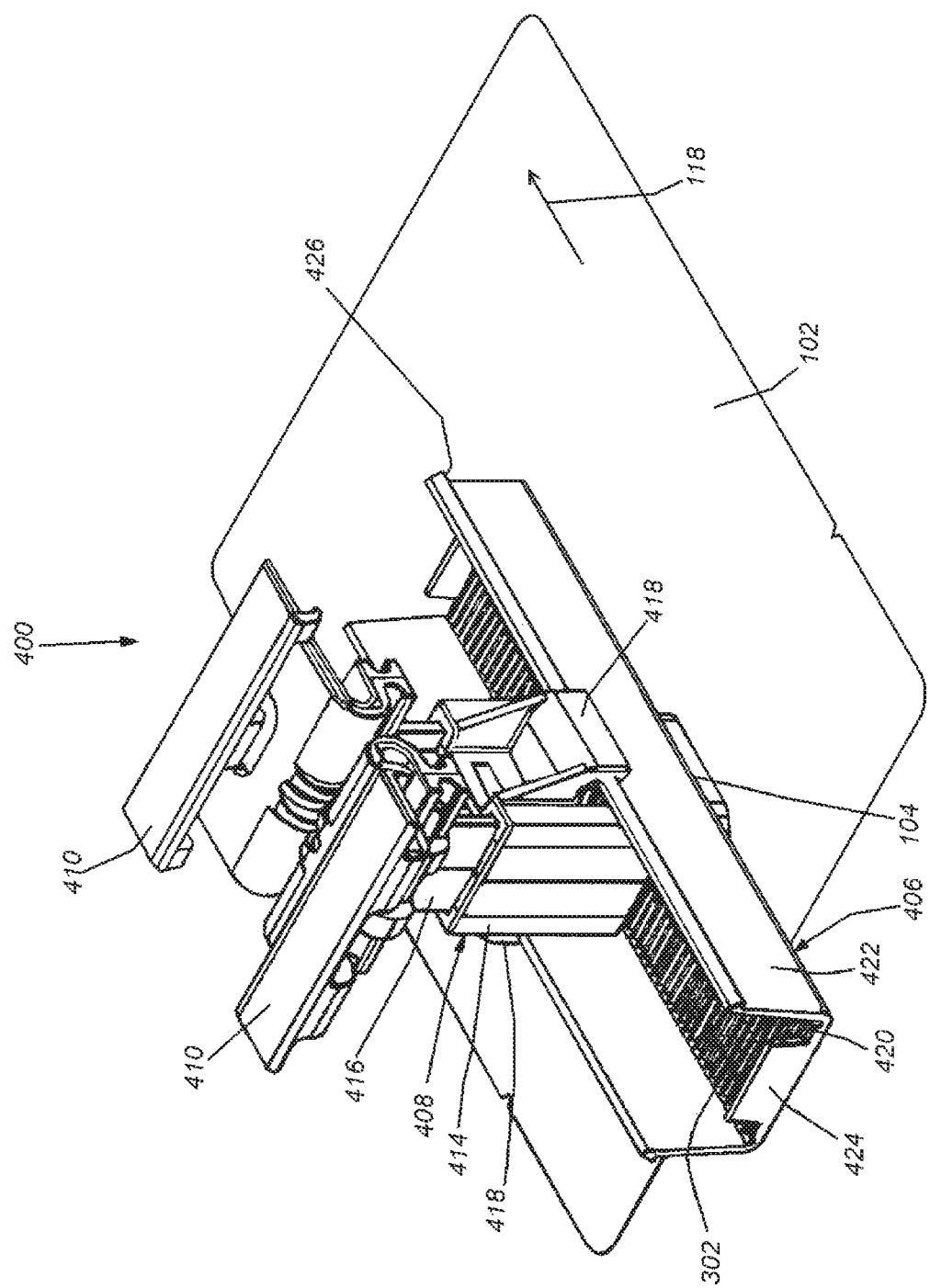
FIG. 4 is a perspective view of a system with wings and an exterior snap fitting for mounting PV modules to a rooftop, according to an illustrative embodiment.

FIG. 4 is a perspective view of a system with wings and an exterior snap fitting for mounting PV modules to a rooftop, according to an illustrative embodiment. In the embodiment, a PV mounting system 400 can include a flashing 102, waterproofing union 104, adjustable foot 406, mounting stand 408, and top and bottom clips 410 that can be the same or mirror images. Having the same clip 410 for the top and bottom clip can reduce the number of parts required for an installation, which can reduce the time and cost of the installation. The system can be installed with direction arrow 118 pointing to the top of the roof. Mounting stand 408 can have a mounting base 414, a mounting post 416, and at least one wing 418. Foot 406 can have a floor 420, sidewalls 422, and a stopper 424. The at least one wing 418 can extend outward from the mounting stand 408 and downwards over at least a portion of the sidewall 422.

The foot 406 can have a snap fitting 426 that can extend at least partially along the length of the foot, and the mounting base 408 can have a first clip-in channel and a second clip in channel on an inner surface of the wing 418, explained more fully below. In various embodiments, snap fitting 426 can be one or more outward ridges that can extend outwards from the sidewalls 422, or other protrusions extending outward. As shown in FIG. 4, snap fitting 426 can be a ridge extending outwards from a portion of the sidewall 422 near the top of the sidewall 422. Adjustable foot 406 can have foot snap-in grooves 302, and the mounting stand 408 can have base snap-in grooves, so that foot snap-in grooves 302 and base snap-in grooves can engage with each other, as shown in FIG. 3 and described above, to prevent mounting stand 408 from sliding within the foot 406.

Figure 5A:
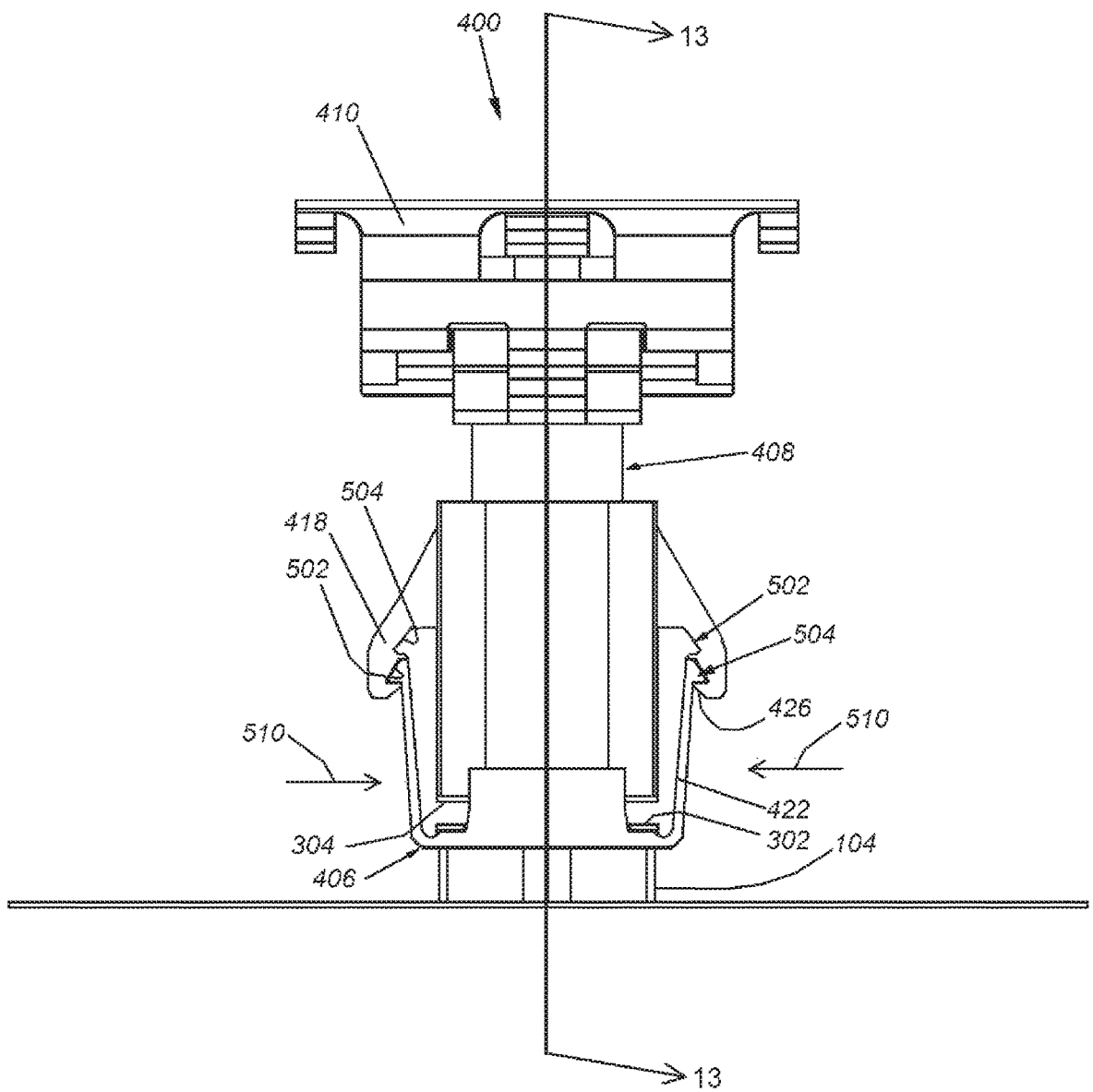
FIG. 5A is an end view of the system of FIG. 4 with wings and exterior snap fitting for mounting PV modules to a rooftop, according to the illustrative embodiment.

FIG. 5A is an end view of the system of FIG. 4 with wings and exterior snap fitting for mounting PV modules to a rooftop, according to the illustrative embodiment. As shown in FIG. 5, the PV mounting system 400 can have clips 410, a mounting stand 408, a foot 406, waterproof union 104, and flashing 112. The mounting stand 408 can have wings 418 with a first clip-in channel 502 and a second clip-in channel 504. The foot 406 can have sidewalls 422 with snap fittings 426. An installer can engage the mounting stand 408 with the foot 406 by pressing the mounting stand 408 onto the foot 406 so that the wings 418 flex outwards and/or the sidewalls 422 flex inwards until the snap-fitting 426 snaps into place in the first snap-in channel 502. With the snap fitting 426 engaged in the first snap-in channel 502, the mounting stand 408 can be maintained in a first engagement position with the foot 406, and can slide along the length of the foot 406.

Figure 5B:
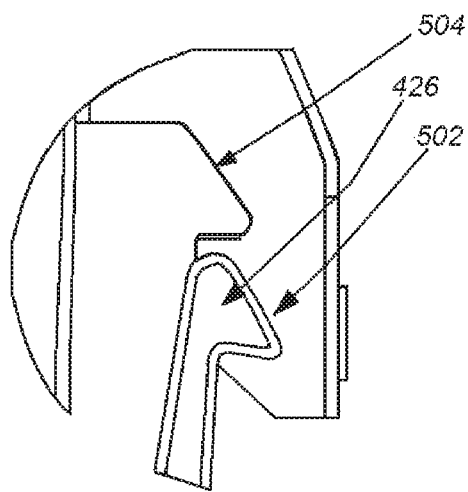
FIG. 5B is an enlarged partial end view of the snap fitting and snap-in channels of FIG. 5A, showing the snap-fitting engaged in the first snap-in channel, according to the illustrative embodiment.
Figure 5C:
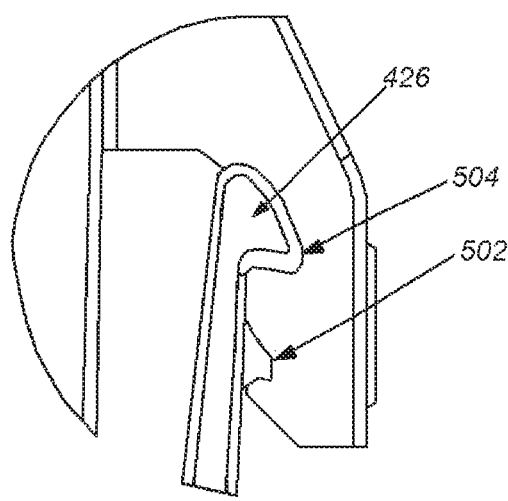
FIG. 5C is an enlarged partial end view of the snap fitting and snap-in channels of FIG. 5A showing the snap-fitting engaged in the second snap-in channel, according to the illustrative embodiment.

FIG. 5B is an enlarged partial end view of the snap fitting and snap-in channels of FIG. 5A, showing the snap fitting engaged in the first snap-in channel, according to the illustrative embodiment. When the mounting stand 408 is in the first engagement position, the snap-fitting 426 can be engaged in the first snap-in channel 502, and the second snap-in channel 504 can be empty. With the mounting stand 408 in the first engagement position, the mounting stand 408 can be adjusted into a desired location, and then the mounting stand 408 can then be further pressed onto the foot 406 so that the snap-fitting 426 can snap into the second snap-in channel 504. FIG. 5C is an enlarged partial end view of the snap fitting and snap-in channels of FIG. 5A, showing the snap fitting engaged in the second snap-in channel, according to the illustrative embodiment. When the mounting stand 408 is in the second engagement position, the snap-fitting 426 can be engaged in the second snap-in channel 504, and the first snap-in channel 502 can be empty.

Turning back to FIG. 5A, when the snap fitting 426 is engaged in the second snap-in channel 504, the mounting stand 408 can be in a second engagement position with the foot 406. In the second engagement position, the foot snap-in grooves 302 and the base snap-in grooves 304 can be enmeshed together so that the mounting stand 408 can be held in a fixed location relative to the foot 406. It is specifically contemplated that in various embodiments, there can be more than one snap fitting 426 and more than two snap-in channels, so that the first and second engagement positions can be each held by a plurality of snap-fittings engaged in channels on each side.

In various embodiments of PV module installation the mounting stand 408 can first be pressed into the first engagement position, and then a PV module frame can be attached to a clip 410 prior to pressing the mounting stand 408 into the second engagement position. An installer can determine the desired location for the PV module and the PV module frame, and therefore the correct location for the mounting stand 408, while the mounting stand 408 is still in the adjustable first engagement position and can then press the mounting stand downwards into the second engagement position in the desired location.

The mounting stand 408 can be quickly and easily removed from the foot 406 for further adjustments, emergencies, or repairs. An installer or other user can remove the mounting stand 408 from the foot 406 by first pressing inwards on the sidewalls 422 along vector arrows 510. When the sidewalls 422 are pressed inwards along vector arrows 510, the snap-fittings 426 can be disengaged from the snap-in channels, thereby freeing the mounting stand 408 from the foot 406 so that the mounting stand 408 can be removed.

Figure 6A:
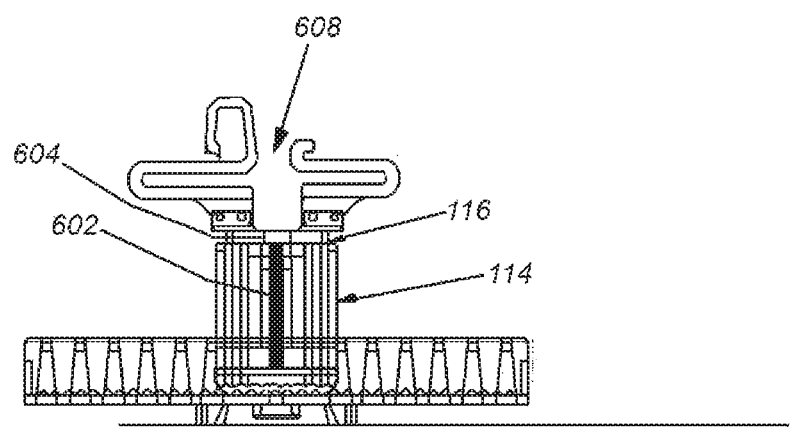
FIG. 6A is an exposed side view of the mounting system of FIG. 1 shown at a first vertical adjustment height, according to an illustrative embodiment.
Figure 6B:
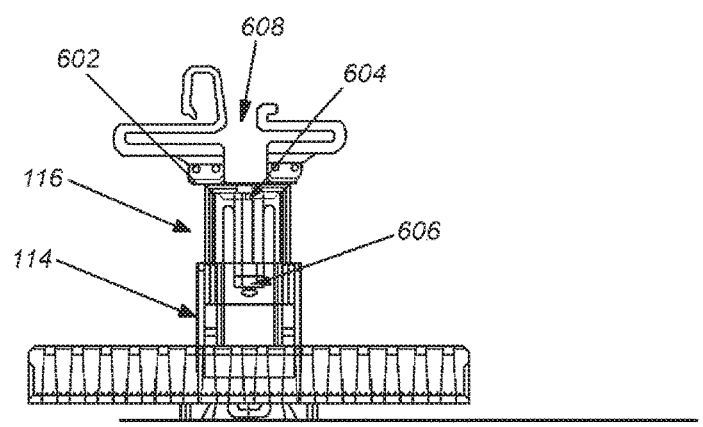
FIG. 6B is an exposed side view of the mounting system of FIG. 6A shown at a second vertical adjustment height, according to an illustrative embodiment.

An example of a mechanism to enable post-installation vertical adjustment is shown in FIGS. 6A and 6B. FIG. 6A is an exposed side view of the mounting system of FIG. 1 shown at a first vertical adjustment height, and FIG. 6B is an exposed side view of the mounting system shown at a second vertical adjustment height, according to an illustrative embodiment. The height of mounting stand 108 can be adjusted by sliding mounting post 116 within mounting base 114. An adjusting screw 602 can be seated in a cavity 604 so that the top and bottom of its head is in contact with a section of mounting post 116, thereby securing the location of the adjusting screw 602 relative to the mounting post 116. Adjusting screw 602 can engage a threaded feature 606, such as a bar nut, that can be secured in mounting base 114. Thus, by turning adjusting screw 602 clockwise, the adjusting screw 602 is lowered in the threaded feature 606 and pulls mounting post 116 down. Conversely when adjusting screw is tuned counter-clockwise, it is displaced upwards in threaded feature 606, and thus pushes mounting post 116 upward. As anyone skilled in the art will appreciate, clockwise and counter-clockwise for up and down can be interchanged easily and such mechanisms are ubiquitous and illustrated here merely per example. Adjustment of the height of the mounting stand 108 is dependent on the length of adjusting screw 602 as well as the length of mounting post 116 and mounting base 114. FIG. 6A shows the system in its lowest position and FIG. 6B shows the system fully extended. Adjustment can be in a range from approximately 0.5 inches to approximately 6 inches depending on the design variables above. Mounting post 116, mounting base 114, threaded feature 606, and adjusting screw 602 can be made from various materials such as metals that will include steel, stainless steel, aluminum and various plastics that are suitable to forming such as thermoplastics and thermosets, filled and unfilled. The filler can be glass, carbon fiber or any other material known in the art to provide positive benefits to mechanical and physical properties. The choice of material for any of these components should be selected so that they pass the relevant UL or international standards such as UL2703. IEC 61215 and IEC 61730.

In order to rotate adjusting screw 602, a tool that engages a receptacle or head in adjustment screw 602 can be utilized. Such a tool can be mechanized or not and can provide additional torque and speed of rotating to speed up installation. The system can also be made such that tool gap 608 is large enough to enable the seamless inserting and removing of a tool to engage adjusting screw 602. As another example, the tool that is utilized to rotate adjusting screw 602 can be the same as the one utilized to rotate lag bolt 206. This drives installation cost down by reducing the number of tools required for system installation to one, further reducing number of parts and the number of tools to be taken onto the roof as well as speeding up the installation and saving direct labor time.

In some applications, the height adjustment or leveling function may not be required. Accordingly, in various embodiments the number of parts can be further reduced by using a mounting stand that does not have the height adjustment feature. A mounting stand without the height adjustment feature can be a fixed-height mounting stand and can be free of the separate mounting base and mounting post. A fixed-height mounting stand can retain the base snap-in grooves, the snap-in channels, the mounting holes for clips and/or other features. The fixed-height mounting stand can be smaller, lighter, and/or less expensive to manufacture than an adjustable-height mounting stand with the separate mounting base and mounting post that provide the height adjustment or leveling function. The adjustable-height mounting stand can be an optional feature.

Figure 7:
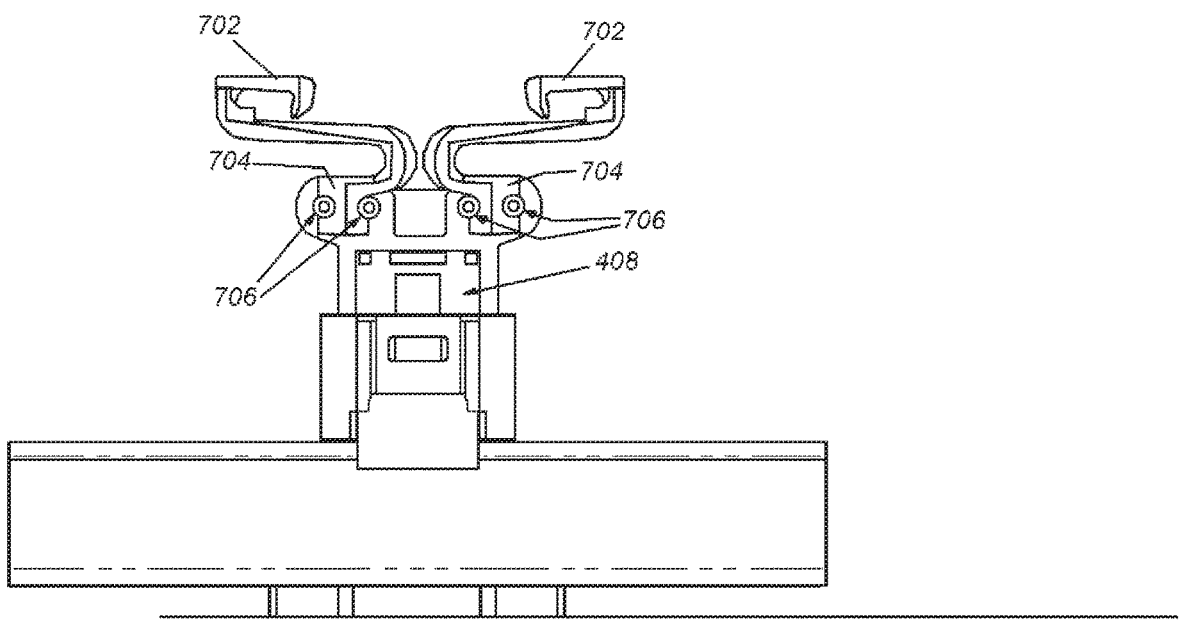
FIG. 7 is a side view of a PV module mounting system showing clips attached to the mounting system by pins, according to an illustrative embodiment.

FIG. 7 is a side view of a PV module mounting system showing clips attached to the mounting system by pins, according to an illustrative embodiment. Clips 702 can have a mounting interface area 704 near the bottom of the clip 702, and the mounting interface area 704 can be used to mount the clips 702 to the mounting stand 408. Mounting stand 408 can have a plurality of mounting holes near the top of the mounting stand, and clips 702 can each have at least one mounting hole or mounting notch in the mounting interface 704. Clips 702 can be attached to the mounting stand 408 by passing fasteners such as pins 706 through the mounting holes or mounting notches in the mounting interface 704 and through the mounting stand 408. Pins 704 can be a rolled stainless steel spring pin, or a solid pins of stainless steel, bolts with nuts, cotter pins, or other pins produced from various materials that can provide appropriate strength without loosening or displacing over time.

A wide variety of clips can be utilized in the PV module mounting system, and can accommodate a wide variety of PV module frames. In various embodiments, the PV module mounting system can be manufactured and sold with different clips attached to the mounting stand 408 with pins 706. The choice of clip can depend on the needs of individual installation jobs based on the particular PV module frame to be installed, explained more fully below. In alternate embodiments, the mounting stands 408 and clips can be sold separately, and an installer or other user can assemble each mounting stand to have an appropriate clip depending on the needs of individual installation jobs.

Figure 8A:
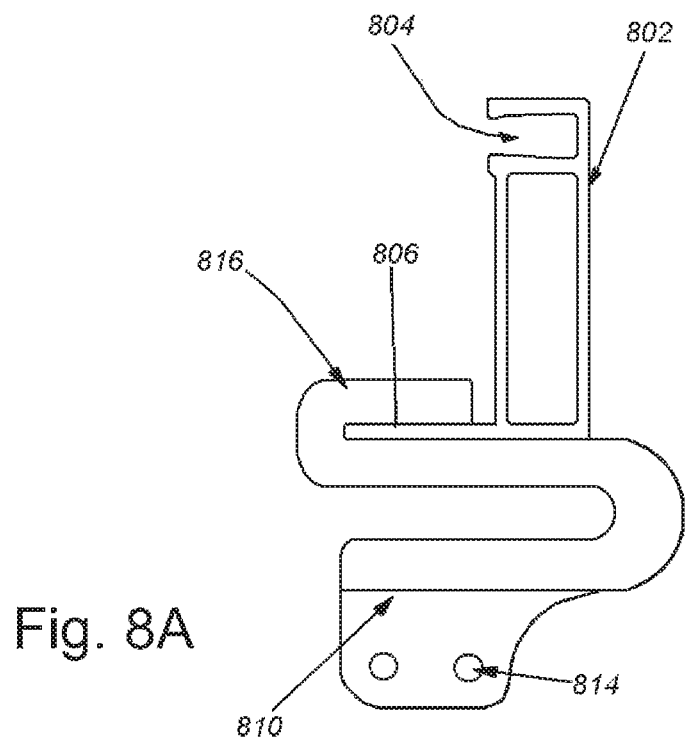
FIG. 8A is a side view of a PV module frame engaged with a top clip, according to an illustrative embodiment.
Figure 8B:
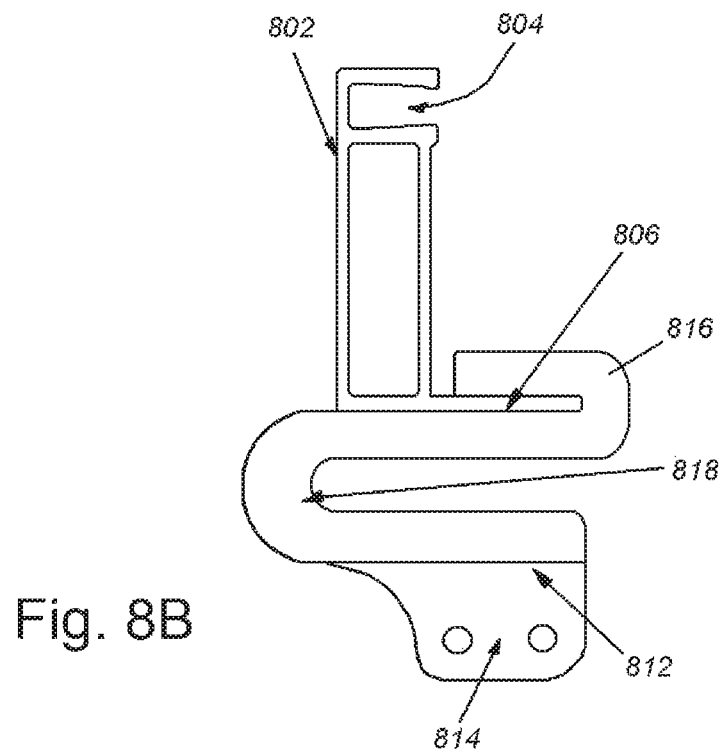
FIG. 8B is a side view of a PV module frame engaged with a bottom clip, according to an illustrative embodiment.

FIGS. 8A and 8B show an illustrative example of how a PV mounting system can be attached to a conventional PV module with a standard aluminum PV frame. FIG. 8A is a side view of a standard PV module frame engaged with a top clip, FIG. 8B is a side view of a standard PV module frame engaged with a bottom clip, according to an illustrative embodiment. A typical module frame profile, 802, is an extruded aluminum beam that has mounting cavity 804 and attachment lip 806. Mounting cavity 804 is designed to receive the solar laminate, including at least one solar cell, and the laminate can be affixed to frame 802. The laminate can be affixed to the frame 802 with an adhesive, or other means as will be appreciated by those skilled in the art.

In various embodiments, top clip 810 and bottom clip 812 can be mirror images of each other, as shown in FIGS. 8A and 8B. Top clip 810 and bottom clip 812 can each have a mounting interface 814. Mounting interface 814 can have at least one hole for a mounting pin, and can connect mounting clips 810 and 812 to the mounting post 116 as shown in FIG. 1 via at least one pin as will be appreciated by those skilled in the art. Both clips can have a receptacle lip 816 formed so that attachment lip 806 of frame 802 can slide and nest within it. Receptacle lip 816 is further designed and formed to allow for the misalignment of frames 802, the thermal expansion of frame 802, as well as to withstand the forces imposed on it by wind and snow loads. Because the frame is not rigidly clamped by the clip, the frame can be out of square or otherwise not at right angles and the clip can continue to retain the frame. The frame can also slide in the clip in both the directions of the x and y axes as the module grows or contracts under heat and/or cold. Mounting clips 810 and 812 can be made from a number of plastics and metals as appreciated by those skilled in the art. Mounting clips 810 and 812 can be formed by means of extrusion, molding including injection molding, machining or any other method that allows the material to be formed so that it performs the intended function. As can be appreciated by those skilled in the art, the example in FIGS. 8A and 8B is purely illustrative, and top and bottom mounting clips can take any form and be made from any material as long as it performs the function of securing frame 802 to keep it in place under all operating conditions as well as pass all required certification tests.

Figure 9A:
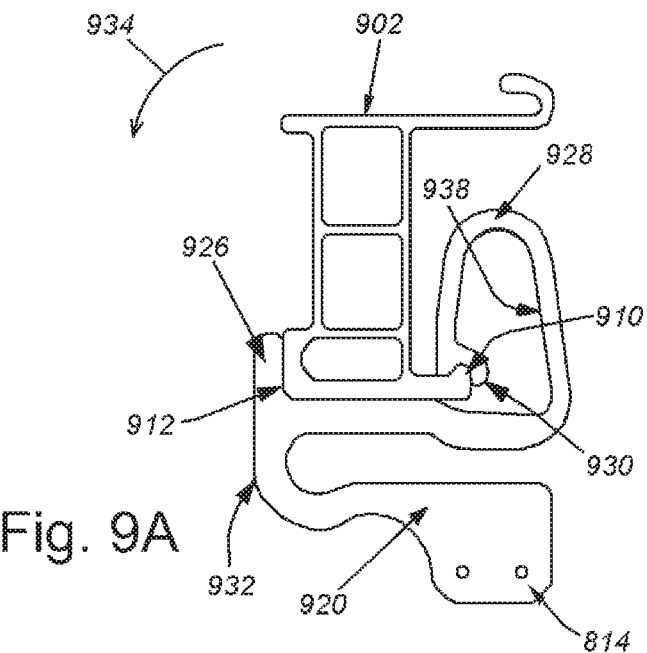
FIG. 9A is a side view of an alternate PV module frame engaged with a top clip, according to an illustrative embodiment.
Figure 9B:
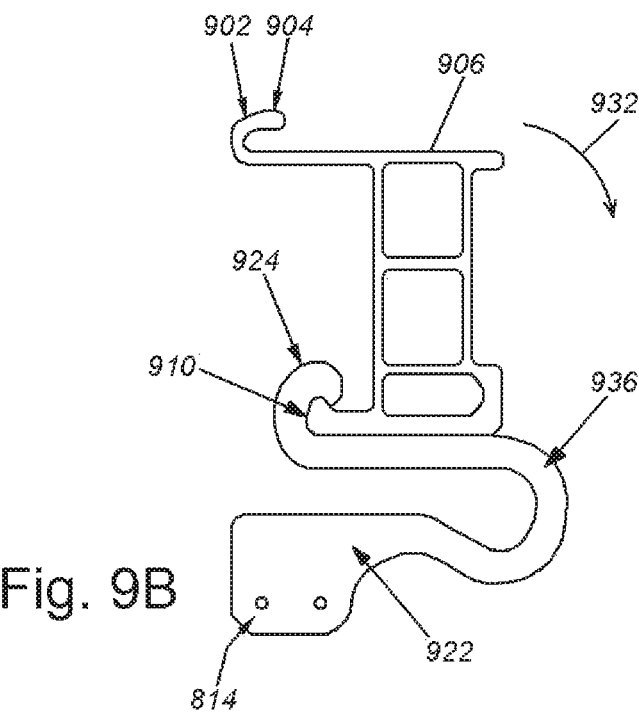
FIG. 9B is a side view of the alternate PV module frame engaged with a bottom clip, according to an illustrative embodiment.

FIG. 9A is a side view of an alternate PV module frame engaged with a top clip, and FIG. 9B is a side view of the alternate PV module frame engaged with a bottom clip, according to an illustrative embodiment. Mounting clips 920 and 922 can be secured to post 116 via pins through holes in mounting interface 814. In this example, a frame 902 of a PV module is shown with an alternate form with unique features. As will be appreciated by those skilled in the art these features can take on a multitude of shapes and forms in order to accomplish the functions required of the frame. The functions of the frame can include containing the solar laminate of a PV module, attaching the module to the mounting hardware and providing structural strength to the PV module. In the illustrative example of FIGS. 9A and 9B, frame 902 can include a laminate mounting cavity 904, a mounting securing face 906 and a top clip interface As will be apparent the laminate can be supported by mounting cavity 904 and mounting securing face 906, and can be secured with an adhesive or other means of securing the frame to the clip, as will be apparent to one skilled in the art. The structure and cross section of frame 902 can be determined by the normal and shear forces that act on the frame during required operations. There are a number of ways to optimize the shape and size of the frame depending on the material used, the expected operating conditions and code requirements.

The frame can also feature mounting lip 910 and slip face 912. The mounting lip 910 and the slip face 912 can interact with top clip 920 and bottom clip 922 as shown, after the PV module is assembled. Bottom clip 922 can have a securing arm 924 that can mate with mounting lip 910, thereby securing frame 902 to bottom clip 922 while bottom clip 922 supports the frame 902. Top clip 920 can have a wall 926 and a spring member 928 with cavity 930. To secure frame 902, frame 902 can be pushed down onto spring member 928, thereby pushing cavity 930 away from wall 926, creating enough space for mounting lip 910 to slide into cavity 930. The combination of shape and material of spring member 928 can be such that it acts like a spring, so that it can allow cavity 930 to move away from wall 926, while still applying a resisting force toward wall 926. This proportional force can secure lip 910 into cavity 930 and push slip face 912 onto wall 926, so that the frame 902 can be held in place between the cavity 930 and the wall 926. It should be clear to those skilled in the art that the mechanisms described above can allow frame 902 to be secured to clips 920 and 922, and that the act of attachment will provide feedback that the system is secured. This feedback might be in the form of tactile, audio or visual means. The design described above contains certain features to accomplish the goal of mounting frame 902 to clips 920 and 922. It will be obvious to those skilled in the art that these features serve as an example and can be obtained by different means and designs. It should also be obvious that the features of clips 920 and 922 are adapted to hold the frame 902, and that in various embodiments various clips can be used to hold various frames.

When frame 902 of a PV module is secured to the roof via clips 920 and 922 of the mounting system it will be subjected to a number of mechanical loading conditions.

These include snow loads, wind loads, gravitational loads, and loads due to installers walking onto the PV modules. It is an object of this invention to provide a mounting system that will be able to withstand all these required loads and keep frame 902 secured during these loading conditions. During loading conditions, clips 920 and 922 can be flexible to avoid breaking, and can increase their holding strength of the frame 902 and the securing of the frame 902 when clips 920 and 922 are flexed. In the case of snow loading, the module can experience a downward force that can in turn cause bottom clip 922 to rotate clockwise as shown by direction arrow 932, and top clip 920 to rotate counter-clockwise as shown by direction arrow 934. Bottom clip 922 and top clip 920 can flex to allow rotation. Under this rotational force, frame 902 in clip 920 can force lip 910 into cavity 930, thereby bending and displacing spring member 928, further increasing the downward force on lip 910 and increasing the force of the engagement between clip 920 and frame 902. Similarly, as frame 902 rotates clockwise on bottom clip 922 mounting lip 924 will resist the disengagement of lip 910. Both clips 920 and 922 are designed with spring arm 936 that will resist these motions less than a stiff clip would. This is intended to reduce the stress concentrations on the clip material, thereby enabling the use of softer materials such as plastics or engineered composites without the fear of stressing the material beyond the point of failure. Similarly when wind load is applied to PV module, it can place an upward force on frame 902, rotating frame 902 in bottom clip 922 counter-clockwise and frame 902 in top clip 920 clockwise, in the opposite direction from arrow 934. In this case, slip face 912 can be forced into wall 926, reducing the probability of frame 902 rotating out of top clip 920. The upward force on frame 902 can also engage lip 910 into the cavity 930 of the top clip 920 and mounting lip 924 of the bottom clip 922, further decreasing the possibility of the system releasing frame 902.

A PV mounting system can have a fast-release feature, so that panels can be removed quickly for emergencies, for repair, for readjustment, or other reasons. In various embodiments, when it is required to release frame 902 from the mounting system, pulling spring member 928 back along vector arrow 938 away from frame 902 can release lip 910 from cavity 930, thereby allowing for frame 902 of the PV module to be released from top clip 920. Once frame 902 is released from top clip 920, frame 902 can be rotated to such an angle that lip 910 can rotate out of securing arm 924 thereby releasing frame 902 completely from the mounting system. In various embodiments, spring member 928 can be broken off utilizing a tool such a crow bar, thereby releasing the frame 902 from top clip 920. The top clip containing the broken spring member 928 can be replaced after maintenance or emergency services are complete by removing the pin from the mounting interface and replacing the top clip, or replacing the mounting post, or replacing the entire mounting stand. As described above in regard to FIG. 8, the mounting base of the mounting stand can also be quickly removed from the foot, allowing for easy adjustment, repair, and/or replacement.

Figure 10A:
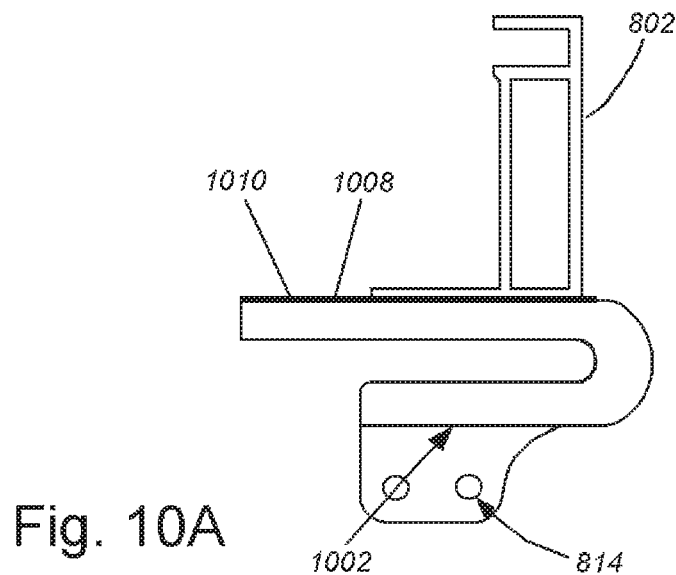
FIG. 10A is a side view of a PV module frame adhered to a top clip, according to an illustrative embodiment.
Figure 10B:
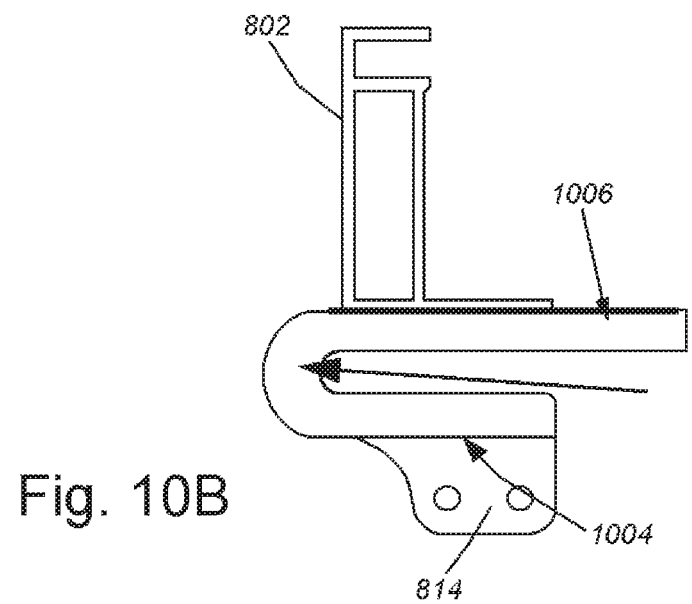
FIG. 10B is a side view of a PV module frame adhered to a bottom clip, according to an illustrative embodiment.

In various embodiments of a PV mounting system, frame 802, 902 or other frames utilized in a PV module can be adhered to the mounting system with an adhesive. FIG. 10A is a side view of a PV module frame adhered to a top clip, and FIG. 10B is a side view of a PV module frame adhered to a bottom clip, according to an illustrative embodiment. Top clip 1002 and bottom clip 1004 can have an extended flat lip 1006 with an adhesion surface 1008. In the illustrative example shown in FIGS. 10A and 10B, conventional frame 802 is used but it should be clear that the principles disclosed herein using adhesive can work with any type of frame profile. Adhesive 1010 can be placed between frame 802 and the adhesion surfaces 1008 of clips 1002 and 1004. The adhesive 1010 can bond clips 1002 and 1004 to frame 802. To withstand the required forces placed onto adhesive 1010, the length of clips 1002 and 1004 into the page, along the y-axis in a side-to-side direction along the roof, is sized such that sufficient surface area of adhesive 1010 is in contact with both clips 1002 and 1004, and frame 802. The manufacturer of adhesive 1010 issues a product specification that stipulates the area required for a specified force, and this can be utilized to calculate the minimum contact area between top clip 1002 and frame 802, and between bottom clip 1004 and frame 802. As will be understood by those skilled in the art, adhesive 1010 can be of any type of adhesive. For example adhesive 1010 can be a glue, an epoxy that is made up of one or more parts, a peel and stick type tape such as 3M VHB or any other type of adhesive. Furthermore, adhesive 1010 can be of a quick release type or reclosable type such as a hook-and-loop (e.g. Velcro®) system or a Dual-Lock™ system that can withstand the required loads but can be released when subjected to other types of loads. Furthermore, the materials utilized for the adhesives can take on a number of metals, non-metals and plastics, as long as they fulfill the relevant certification requirements. Additionally adhesive 1010 can be placed on a surface that can be flat as shown in FIGS. 10A and 10B, or on a non-flat surface that mates clips 1002 and 1004 to frame 802.

Figures 11A, 11B:
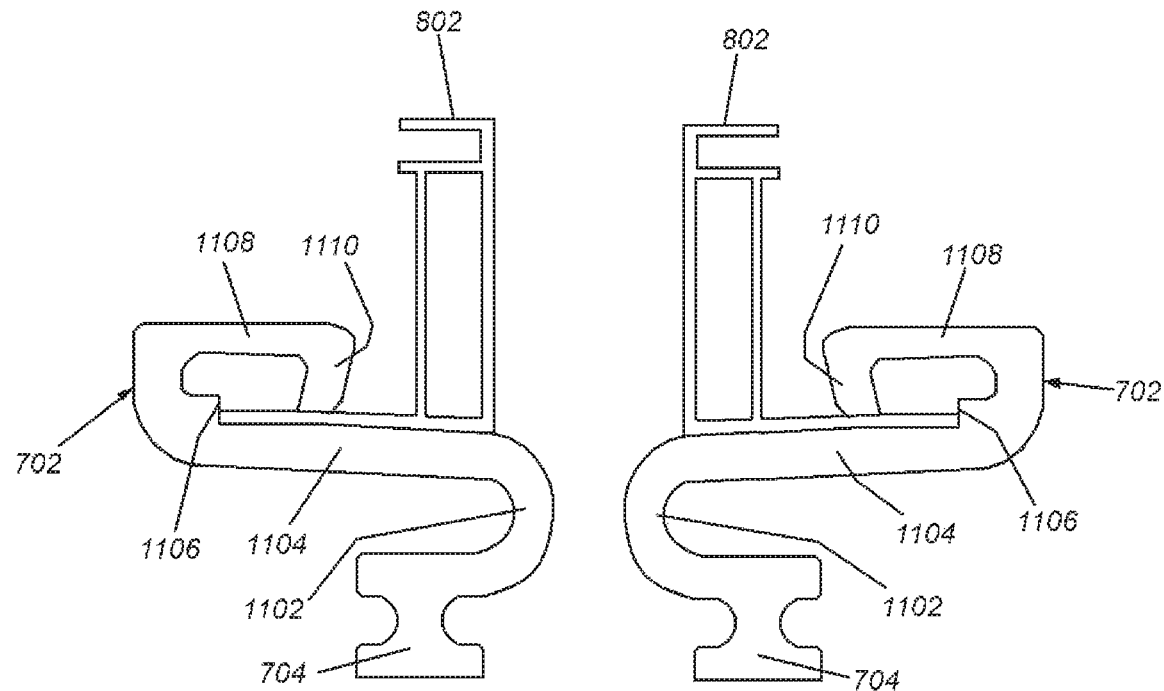
FIG. 11A is a side view of a PV module frame engaged with a top clip, according to another illustrative embodiment.
FIG. 11B is a side view of a PV module frame engaged with a bottom clip, according to another illustrative embodiment.

FIG. 11A is a side view of a PV module frame engaged with a top clip, and FIG. 11B is a side view of a PV module frame engaged with a bottom clip, according to another illustrative embodiment. Top clip 702 and bottom clip 702 can be the same or mirror images of each other. Clips 702 can have a mounting area 704, a lower spring section 1102, a flat surface 1104, a bulwark 1106, and a holding arm 1108 that can have one or more holding fingers 1110. A frame 802 can be supported on flat surface 1104 and can rest against bulwark 1106. The holding arm 1108 can curl up and around and onto the lower portion of the frame and can hold the frame 802 in place. The arm 1108 can have a spring quality, so that when forces are exerted on the frame that can pull or push the frame out of engagement with the clip 702, those forces can load the spring of the arm 1108, thereby increasing the force the arm exerts downward on the lower portion of the frame to retain the frame in place. The lower spring section 1102 can also flex up or down as needed in response to forces exerted on the PV module. In various embodiments, an adhesive can be used to secure the frame 802 to the flat surface 1104.

The various examples above should illustrate to those skilled in the art that a multitude of frames and clips can be utilized in unison to ensure that the frame is secured to the mounting system under all loading conditions and furthermore provide for fast installation and ease of release. It should be noted that the clips can be custom designed for specific frames in order to achieve the improvements of the mounting system as described. Furthermore, as will be known to those skilled in the art, utilizing pins and mounting holes in mounting interface 814 to attach top and bottom clips to top post 116 will enable the mounting system to be used with any frame and clip combination.

Figure 12:
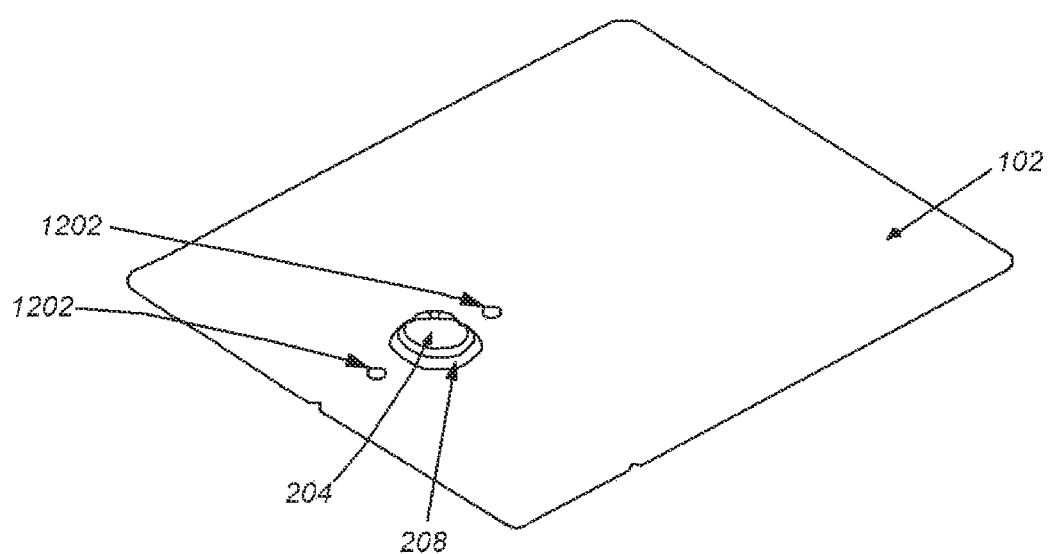
FIG. 12A is a perspective view of a flashing with raised guides, according to an illustrative embodiment.
FIG. 12B is a bottom view of a foot with a mating profile and a foot base, according to an illustrative embodiment.
Figure 12B:
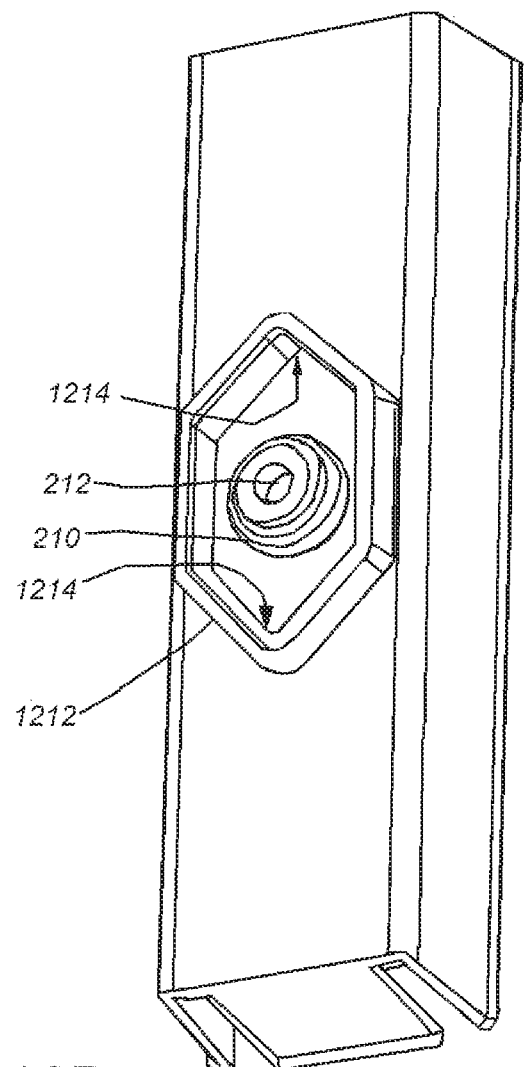

FIG. 12A is a perspective view of a flashing with raised guides, according to an illustrative embodiment. A flashing 102 can have a clearing hole 204, a raised neck rim 208, and at least one raised guide 1202. The at least one raised guide 1202 can be used to help guide a foot into the desired position on the flashing 102. FIG. 12B is a bottom view of a foot with a mating profile and a foot base, according to an illustrative embodiment. A foot 106 can have a fastener hole 212, a mating profile 210, and a raised foot base 1212. Foot base 1212 can have guide areas 1214 that can be used to help guide the foot 106 into position on the flashing 102. An installer can set the foot 106 in approximately the right location on the flashing, and the raised guide 1202 and the foot base 1212 can provide tactile feedback to the installer when the foot base 1212 has shifted down into the desired position with the guides 1202 in the guide areas 1214.

Figure 13:
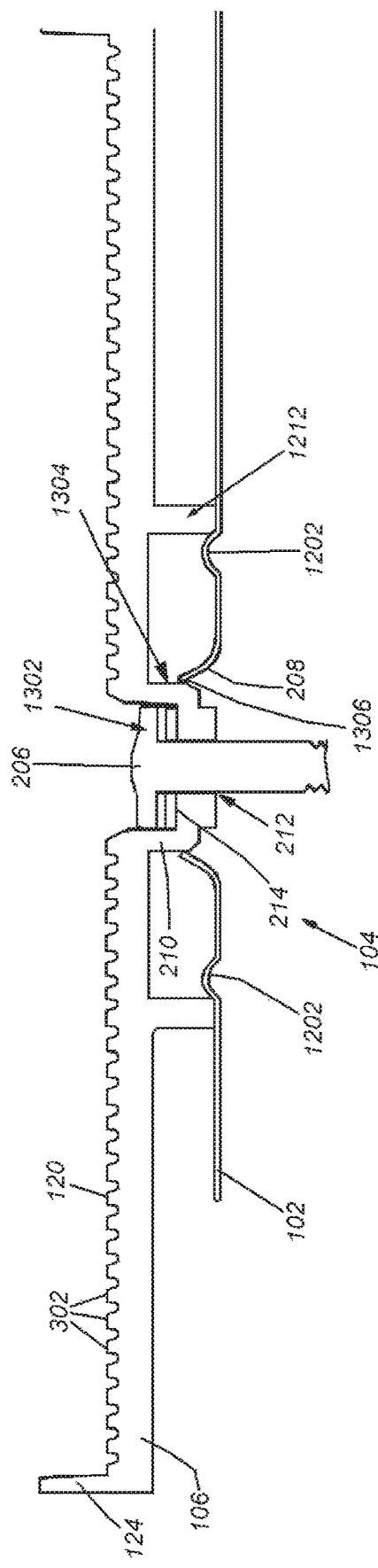
FIG. 13 is a cross sectional view of a flashing, a foot, and a waterproof union, taken along cross section line 13-13 of FIG. 5A, according to an illustrative embodiment.

FIG. 13 is a cross sectional view of the foot, flashing, and waterproof union, taken along cross section line 13-13 of FIG. 5A, according to an illustrative embodiment. Foot 106 can have a floor 120 with foot grooves 302, a foot base 1212, a fastener hole 212, a seat 214, an elastomeric seal 1302, and a mating profile 210. Flashing 102 can have at least one raised guide 1202 and a neck rim 208. The waterproof union 104 can be formed when the foot 106 is engaged with the flashing 102. The waterproof union 104 can provide multiple barriers to the ingress of water below the flashing. The foot base 1212 can provide a first barrier to water ingress by diverting the flow of water down the flashing when the system is positioned in a typical configuration on a sloped roof. The foot base 1212 can be separated substantially from the neck rim 208, and the raised neck rim 208 can act as a second barrier to any water that is not diverted away by the foot base 1212. A third barrier to water ingress can be formed when the mating profile 210 forms an interference fit with the inside of the hole of the neck rim 208. The mating profile 208 can have a cork section 1304 that can be a constant-diameter cylinder, and a curved or sloped transition section 1306 below the cork section 1304. The transition section 1306 can be inserted into the neck rim 208, and then when the bolt 206 is tightened into the roof the cylindrical cork section 1304 can be drawn down into the neck rim 208 to form a watertight seal between the neck rim 208 and the mating profile 210. In various embodiments, the cylindrical cork section 1304 of the mating profile 210 can increase slightly in diameter from bottom to top to improve the interference fit with the neck rim 208. Mating profile 210 can fit tightly inside the neck rim 208 without (free of) contacting the upper surface of the flashing 102 or the upper surface of the neck rim 208. Neck rim 208 can fit tightly around the mating profile 210 without (free of) contacting the lower surface of the foot 106. In various embodiments, the flashing 102 and neck rim 208 can be made of a metal and the foot 106 and mating profile 210 can be made of a plastic, so the plastic mating profile 210 can deform slightly as it is drawn into the neck rim 208, thereby allowing the plastic mating profile 210 to conform to the neck rim 208, and increasing the effectiveness of the seal.

Figure 14:
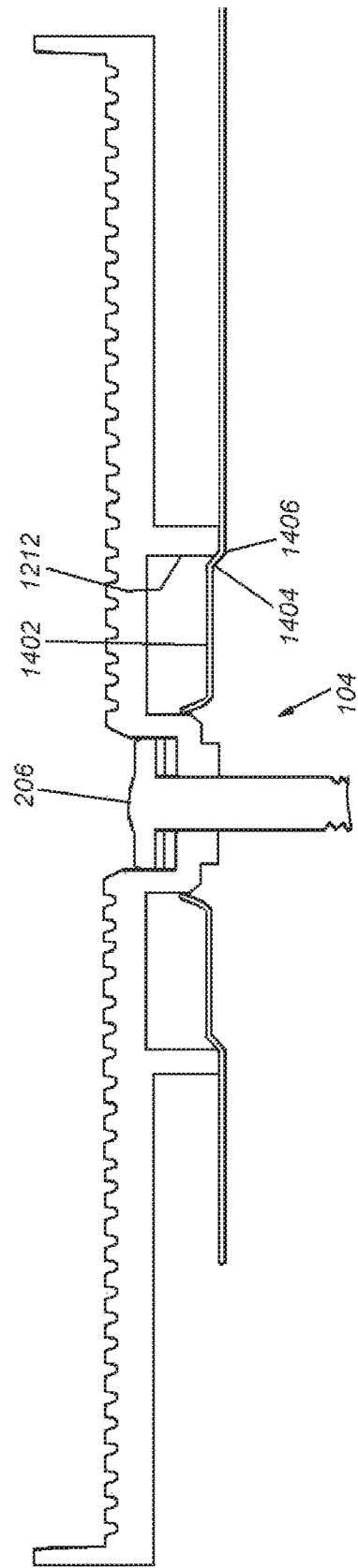
FIG. 14 is a cross sectional view of a flashing with a plateau, a foot, and a waterproof union, taken along cross section line 13-13 of FIG. 5A, according to an illustrative embodiment.

FIG. 14 is a cross sectional view of a flashing with a plateau, a foot, and a waterproof union, taken along cross section line 13-13 of FIG. 5A, according to an illustrative embodiment. In various embodiments, a flashing 102 can have a raised plateau 1402. The raised plateau 1402 and the foot base 1212 can be sized and shaped to nestle together, thereby forming an additional barrier to the ingress of water. The raised plateau 1402 can include a plateau wall 1404 and lower plateau corner 1406, and the foot base 1212 can be pulled tight against the plateau wall 1404 and plateau corner 1406 when the fastener 206 is tightened into the roof.

FIG. 15 is a cross sectional view of a flashing with a trench, a foot, and a waterproof union, taken along cross section line 13-13 of FIG. 5A, according to an illustrative embodiment. In various embodiments, a flashing 102 can have a trench 1502. The trench 1502 and foot base 1212 can be sized and shaped to nestle together to help to locate the foot on the flashing, and thereby forming an additional barrier to the ingress of water. The foot base 1212 can be pulled tight into the trench 1502 when the fastener 206 is tightened into the roof.

FIG. 16 is a cross sectional view of a flashing, a foot, and a waterproof union with an elastomeric seal, taken along cross section line 13-13 of FIG. 5A, according to an illustrative embodiment. In an embodiment, the waterproof union 104 can include an elastomeric seal 1602 between the foot 106 and the flashing 102. Elastomeric seal 1602 can be EPDM or other elastomeric materials as will be understood by one skilled in the art. The elastomeric seal 1602 can be used in conjunction with a trench 1502, as shown in FIG. 16, however, it should be clear that the elastomeric seal can be also used in any of the above embodiments, including a plateau or a flush surface of a flashing 102. When the fastener 206 is tightened into the roof, the foot 106 can be pulled down towards the flashing 102, and the elastomeric seal 1602 can be compressed between the foot base 1212 and the flashing 102.

FIG. 17 is a cross sectional view of a flashing with an open feature to allow trapped water to escape, a foot, and a waterproof union with an elastomeric seal, taken along cross section line 13-13 of FIG. 5A, according to an illustrative embodiment. The flashing 102 can have an open groove 1702 at a downhill portion of the waterproof union 104. The open groove 1702 can be in a small area under the portion of the foot base 1212 that is farthest from the top of the roof, so that any moisture that may be within the foot base 1212 can escape and run down the roof.

FIG. 18 is a cross sectional view of a flashing, a foot, and a waterproof union with additional elastomeric seals, taken along cross section line 13-13 of FIG. 5A, according to an illustrative embodiment. In various embodiments, a waterproof union can have one or more elastomeric seals. Elastomeric seal 1602 can be between the foot base 1212 and the flashing 102. Elastomeric seal 1802 can be located above the neck rim 208 and under the foot 106, so that when the foot 106 is pulled onto the flashing 102, the neck rim 208 can either press into the elastomeric seal 1802, or can be squeezed between the mating profile 210 and the elastomeric seal 1802. Elastomeric seal 1804 can be located inside of the neck rim 208, so that when the foot 106 is pulled onto the flashing, the mating profile 210 can be pulled down onto the elastomeric seal 1804. The various elastomeric seals can each provide additional barriers to water ingress.

Figure 19A:
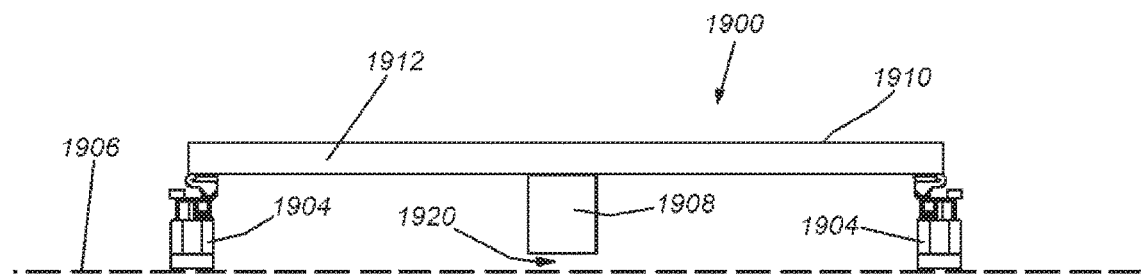
FIG. 19A is a bottom view of an exemplary rail-less mounting system with a displacement restrictor, according to an illustrative embodiment.
Figure 19B:
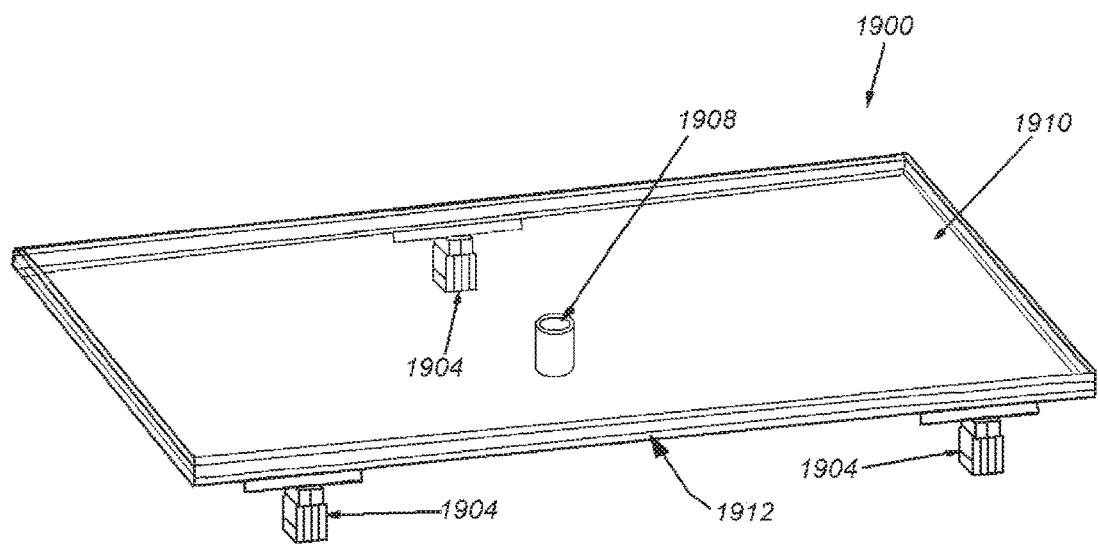
FIG. 19B is a perspective view of the exemplary rail-less mounting system of FIG. 19A with a displacement restrictor, according to the illustrative embodiment.

FIG. 19A is a bottom view of an exemplary rail-less mounting system with a displacement restrictor, and FIG. 19B is a perspective view of the exemplary rail-less mounting system of FIG. 19A with a displacement restrictor, according to the illustrative embodiment. PV Module 1910 can be connected via frame 1912 and mounting clips 1904 to roof surface 1906. When a snow load is applied to the top surface of module 1910, module 1910 and frame 1912 can bend in such a manner that the center of module 1910 is displaced toward roof surface 1906 as will be apparent to those skilled in the art. If module 1910 is allowed to bend too far, frame 1912, mounting clip 1904 or the materials of module 1910 can be subjected to strain that is in excess of their respective material's elastic ability and permanent deformation or failure of the material can occur. However, if the movement of module 1910 is restricted, module 1910 will not be displaced to the point of deformation or failure. An example of such a method of restriction is shown in FIGS. 19A and 19B where a displacement restrictor 1908 can be placed in the middle of module 1910, between module 1910 and roof surface 1906. Optionally displacement restrictor 1908 can be mounted such that it is not permanently in contact with roof surface 1906, and gap 1920 defines the distance that the surface of module 1910 can deflect before displacement restrictor 1908 engages roof surface 1906 and thus provides an opposing force to snow load and restricts the displacement of module 1910. As will be obvious to those skilled in the art, the number of, the construction, the material, the position of displacement restrictor 1908 as well as the type of expected loading are just some of the variables that will define via proper design, gap 1920, and the general shape and size of displacement restrictor 1908. It will be further appreciated that displacement restrictor 1908 can be made from an abundance of materials with associated manufacturing methods. Also, the manner in which displacement restrictor 1908 is attached to module 1900 can be via any binding technique including adhesives, adhesive tape, glues, reclosable fasteners or any other method that can be used to connect the parts. It will also be appreciated that in various embodiments there can be a number of options that can be varied, such as the number of displacement restrictors 1908, whether the displacement restrictor(s) 1908 are optionally connected to roof surface 1906 and/or module 1910, and the optional presence and size of a gap 1920, and these options can be determined by the specific implementation in each installation, so long as such combination results in the system being able to be certified and withstand relevant loading conditions.

When a plastic or other electrically insulating material frame 1912 is used for the module, it can negate the need for grounding according to UL 2703 since there is no exposed metal in contact with the power producing module. This saves the direct material cost and labor of installing bonding means between modules to ensure that they are electrically connected and then connecting the bonded array to ground. Furthermore, the removal of ground removes the reference voltage or potential, the main driver of Potential Induced Degradation (PID). Lastly, NEC 2017 Section 690.12 requires all PV systems to operate with a rapid shutoff device that will disconnect individual PV modules from the system thus making it safe for personnel, especially firefighters, to be able to touch the grounded parts of the system without exposure to high voltage and current. This specific NEC rule is being adopted into most state electrical codes. In response to these regulations, electronic manufacturers are selling a rapid shutoff device and installers are buying and installing one such system per module. Other companies are integrating their shutoff devices with modules. These rapid shutoff devices further increase the cost of the PV system. According to NEC 2017, when the PV system does not require grounding, i.e. if it has no exposed metal parts connected to the individual modules, rapid shutoff devices are not required. Therefore, having a system that does not require grounding will save the direct cost of shutoff devices and installation labor.

An alternative system that can be NEC 2017 compliant without (free of) the use of a plastic frame can use frameless modules. These have become more available on the market and in order to handle the required loads, can be glass-on-glass modules as opposed to the ubiquitous glass-on-backsheet modules as will be appreciated by those skilled in the art. Unfortunately, most installers still utilize some form of metal or other electrically conductive material to mount these systems on the roof. Since the mounting clips are "in direct contact" with the power producing module, these systems still require grounding, negating all the benefits as described above. The system described herein can remove the need for grounding from frameless modules by utilizing non-electrically conductive materials such as plastic for the clips and the rest of the mounting hardware as previously described. As illustrated in FIGS. 8-11, the flexibility of the clip design can allow for any shape to mate with the purposed designed clip, including frameless and glass-on-glass modules.

The advantages of a quick release system should be apparent to those skilled in the art. Being able to remove modules quickly for maintenance, to fix or replace equipment and or to replace the roof are obvious advantages. However, the system described here further provides another benefit of quick release systems: reducing the fire setback requirement in the International Fire Code (IFC 605.11) that is being adopted by many states.

Figure 20A:
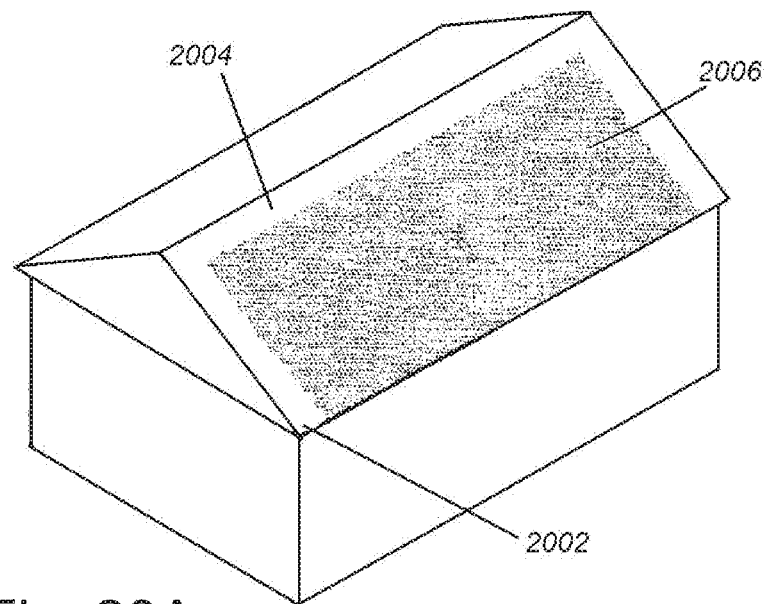
FIG. 20A is a perspective view of a building and sloped rooftop with standard fire setbacks, according to the prior art.
Figure 20B:
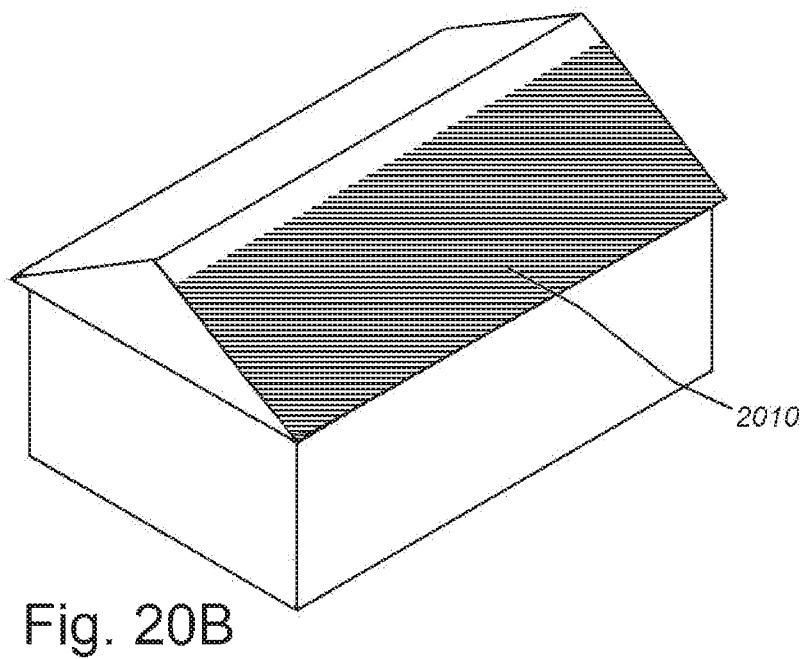
FIG. 20B is a perspective view of an exemplary building and sloped rooftop with reduced fire setbacks, according to an illustrative embodiment.

To illustrate the advantage that can be attained by a quick release mechanism to reduce fire setbacks, refer to the illustrative example in FIGS. 20A and 20B. FIG. 20A is a perspective view of a building and sloped rooftop with standard fire setbacks, according to the prior art; and FIG. 20B is a perspective view of an exemplary building and sloped rooftop with reduced fire setbacks, according to an illustrative embodiment.

FIG. 20A illustrates the setbacks required on a roof according to IFC 605.11. Side setback 2002 is required to be 3 feet from the edge of the roof according to IFC Section 505.11.1.2.3. This requirement has been incorporated into numerous building and electrical codes including NEC 2017. Side setback 2002 is required for firefighter access to the roof in order for the personnel to be able to get to the apex of the roof and create a vent hole for the fire raging inside the house. Fire ventilation holes and their positioning should be obvious to those skilled in the art. Side setback 2002 is required no matter the layout of the roof, even when there is ample access from the other directions of the roof. Apex setback 2004 is required so that a ventilation hole for smoke can be created. However, fire fighters prefer to create the hole directly above the fire since there might be a case where air in the top space of the roof is not directly connected to the air above the fire. Both side setback 2002 and apex setback 2004 limit the size of PV Array 2006. As can be seen in FIG. 20A, PV Array 2006 is bounded by a 3 foot setback from the edges of the roof sans the eave. With 3 feet being almost the width of a module, this means that in a portrait installation two extra columns of modules can be installed. In a landscape installation orientation one extra column can be added. Furthermore if apex setback 2004 can be eliminated, there will be more space for optimizing the layout of the array and another row of modules could be added.

When a quick release system is utilized by the mounting system of PV Array 2006, firefighters will be able to remove PV modules as they scale the roof. Furthermore, firefighters can remove PV modules above the optimal point to make a ventilation hole, and in creating that hole, be able to better contain and control the fire. Thus it is highly desirable to be able to utilize quick release systems.

For PV array 2006, having quick release systems means that local fire departments can train their personnel to utilize the quick release system and can decide that additional roof access is not required when such a system is in place. This will allow system designers to utilize the entire roof space to create an optimal PV array 2010, as shown in FIG. 20B. For system installers, this means a larger system can be installed on the roof. Since cost of sales is an indirect cost, the $/W of this cost drops with systems because the cost remains the same but the system's size in W increases.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, a ratchet system utilizing geared teeth that are engaged with an engagement system can be utilized instead of the adjusting nut and bolt. Also, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. A solar module installation system comprising;
   a mounting base, the mounting base comprising at least one base engagement feature;
   a mounting post, wherein the mounting post is adjustably engaged with the mounting base so that the height of the mounting post with the mounting base is variable;
   at least one mounting clip attached to the mounting post; and
   adjustably foot, the adjustable foot defining a channel configured to receive the mounting base, the adjustable foot comprising at least one foot engagement feature and wherein the base engagement feature and the foot engagement feature can secure the mounting base to the adjustable foot so that the mounting base does not move relative to the adjustable foot.

2. The system of claim 1, wherein the at least one foot engagement feature is at least one foot snap-in groove, and wherein the at least one base engagement feature is at least one base snap-in groove.

3. The system of claim 2, wherein the adjustable foot further comprises at least one clip-in groove configured to slidably engage the mounting base, wherein the clip-in groove slidably holds the mounting base out of engagement with the at least one foot snap-in groove, and wherein an application of force to the mounting base can push the mounting base out of engagement with the clip-in groove and into engagement with the at least one foot snap-in groove.

4. The system of claim 1, further comprising a flashing with a flashing engagement feature, wherein the flashing engagement feature is configured to engage the flashing with the adjustable foot.

5. The system of claim 4, wherein the adjustable flashing engagement feature is a clearing hole, and wherein the adjustable foot further comprises a bolt hole, so that a bolt can be passed through the adjustable foot and the flashing.

6. The system of claim 1, further comprising at least one pin, wherein the at least one mounting clip is pivotably mounted to the mounting post at the at least one pin.

7. The system of claim 1, wherein the mounting post further comprises a screw head cavity, the screw head cavity configured to hold a screw head within the screw head cavity, and wherein the mounting base further comprises a threaded screw engagement feature.

8. The system of claim 7, further comprising an adjustment screw with a screw head, wherein the screw head can be held within the screw head cavity, and wherein the adjustment screw can be threaded through the screw engagement feature of the mounting base, so that turning the adjustment screw in a first direction will cause the mounting post to slide relative to the mounting base to increase the combined height of the mounting clip and the mounting base, and wherein turning the adjustment screw in a second direction will cause the mounting post to slide relative to the mounting base to decrease the combined height of the mounting clip and the mounting base.

9. The system of claim 1, wherein the at least one mounting clip comprises at least one solar module engagement feature, the at least one solar module engagement feature constructed and arranged to be attached to a solar module.

10. The system of claim 1, further comprising at least one non-conductive frame, the at least one frame comprising a lower frame engagement feature and an upper frame engagement feature, the lower engagement feature configured to engage with the at least one mounting clip, and the upper engagement feature configured to be attached to a solar laminate.

11. The system of claim 1, wherein the at least one mounting clip further comprises a flexible member configured to flex under force.

12. The system of claim 1, wherein the at least one mounting clip is configured to have a solar module attached to the at least one mounting clip.

13. The system of claim 1, wherein at least one of the mounting base, the mounting post, the mounting clip, and a PV module frame are comprised of a non-electrically conductive material, wherein the system is free of a grounding unit.

14. The system of claim 1, wherein the at least one mounting clip further comprises a fast-release mechanism configured to release the solar module when a vector force is applied to the fast release mechanism.

15. The system of claim 1, wherein the at least one mounting clip further comprises an adhesive configured to secure a solar module to the mounting clamp.

16. The system of claim 15, wherein the adhesive is a reclosable fastener system.

17. The system of claim 5, wherein the clearing hole is configured to receive a mating profile on the foot, forming a water resistant seal.

18. A solar module installation system comprising;
   a mounting base having a threaded screw engagement feature;
   a mounting post having a screw head cavity, the screw head cavity configured to hold a screw head within the screw head cavity, wherein the mounting post is adjustably engaged with the mounting base so that the height of the mounting post with the mounting base is variable;

at least one mounting clip attached to the mounting post; and an adjustment screw with a screw head, wherein the screw head can be held within the screw head cavity, and wherein the adjustment screw can be threaded through the screw engagement feature of the mounting base, so that turning the adjustment screw in a first direction will cause the mounting post to slide relative to the mounting base to increase the combined height of the mounting clip and the mounting base, and wherein turning the adjustment screw in a second direction will cause the mounting post to slide relative to the mounting base to decrease the combined height of the mounting clip and the mounting base.

* * * * *